United States Patent
Kuang

(10) Patent No.: US 10,271,367 B2
(45) Date of Patent: Apr. 23, 2019

(54) DATA TRANSMISSION METHOD, DEVICE, AND SYSTEM

(71) Applicant: Huawei Technologies Co., Ltd., Shenzhen (CN)

(72) Inventor: Yunsheng Kuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/562,809

(22) PCT Filed: Apr. 1, 2015

(86) PCT No.: PCT/CN2015/075723
§ 371 (c)(1),
(2) Date: Sep. 28, 2017

(87) PCT Pub. No.: WO2016/154971
PCT Pub. Date: Oct. 6, 2016

(65) Prior Publication Data
US 2018/0220482 A1    Aug. 2, 2018

(51) Int. Cl.
*H04W 4/00* (2018.01)
*H04W 76/15* (2018.01)
(Continued)

(52) U.S. Cl.
CPC .............. *H04W 76/15* (2018.02); *H04W 4/80* (2018.02); *H04W 76/10* (2018.02); *H04W 76/14* (2018.02); *H04W 72/0446* (2013.01)

(58) Field of Classification Search
None
See application file for complete search history.

(56) References Cited

U.S. PATENT DOCUMENTS

| 8,249,605 | B2 | 8/2012 | Niranjan et al. |
| 2013/0106613 | A1 | 5/2013 | Lee et al. |
| 2015/0065035 | A1 | 3/2015 | Kim et al. |
| 2015/0372746 | A1 | 12/2015 | Xie et al. |

FOREIGN PATENT DOCUMENTS

| CN | 103618566 A | 3/2014 |
| CN | 103812535 A | 5/2014 |

(Continued)

OTHER PUBLICATIONS

"Specification of the Bluetooth System," XP002777671, Version 4.1 (vol. 0), Internet Citation, Dec. 3, 2013, 26 pages.
(Continued)

*Primary Examiner* — Erika A Washington
(74) *Attorney, Agent, or Firm* — Conley Rose, P.C.

(57) ABSTRACT

A data transmission method, device, and system relate to the field of communications technologies, and provide a more flexible network topology and reduce network overheads. The method includes sending, by a first wearable device, a first broadcast message to a second wearable device, determining whether the second wearable device supports processing of service data of the first wearable device when the first wearable device obtains by listening, a second broadcast message from the second wearable device, and when the first wearable device determines that the second wearable device supports processing of the service data, establishing a connection to the second wearable device, and sending the service data in an allocated receive or transmit timeslot to the second wearable device.

17 Claims, 14 Drawing Sheets

(51) Int. Cl.
    *H04W 76/10*     (2018.01)
    *H04W 76/14*     (2018.01)
    *H04W 4/80*     (2018.01)
    *H04W 72/04*     (2009.01)

(56) References Cited

FOREIGN PATENT DOCUMENTS

| | | |
|---|---|---|
| CN | 104053249 A | 9/2014 |
| CN | 104238752 A | 12/2014 |
| CN | 104410950 A | 3/2015 |
| CN | 104469660 A | 3/2015 |
| CN | 104469980 A | 3/2015 |

OTHER PUBLICATIONS

Foreign Communication From a Counterpart Application, European Application No. 15886941.2, Extended European Search Report dated Mar. 7, 2018, 8 pages.
Machine Translation and Abstract of Chinese Publication No. CN103812535, dated May 21, 2014, 26 pages.
Machine Translation and Abstract of Chinese Publication No. CN104410950, dated Mar. 11, 2015, 20 pages.
Machine Translation and Abstract of Chinese Publication No. CN104469660, dated Mar. 25, 2015, 4 pages.
Foreign Communication From a Counterpart Application, PCT Application No. PCT/CN2015/075723, English Translation of International Search Report dated Jan. 6, 2016, 2 pages.
Foreign Communication From a Counterpart Application, PCT Application No. PCT/CN2015/075723, English Translation of Written Opinion dated Jan. 6, 2016, 6 pages.
Machine Translation and Abstract of Chinese Publication No. CN103618566, Mar. 5, 2014, 12 pages.
Machine Translation and Abstract of Chinese Publication No. CN104238752, Dec. 24, 2014, 21 pages.
Machine Translation and Abstract of Chinese Publication No. CN104469980, Mar. 25, 2015, 18 pages.
Foreign Communication From a Counterpart Application, Chinese Application No. 201580004389.X, Chinese Office Action dated Jan. 3, 2019, 11 pages.

FIG. 6

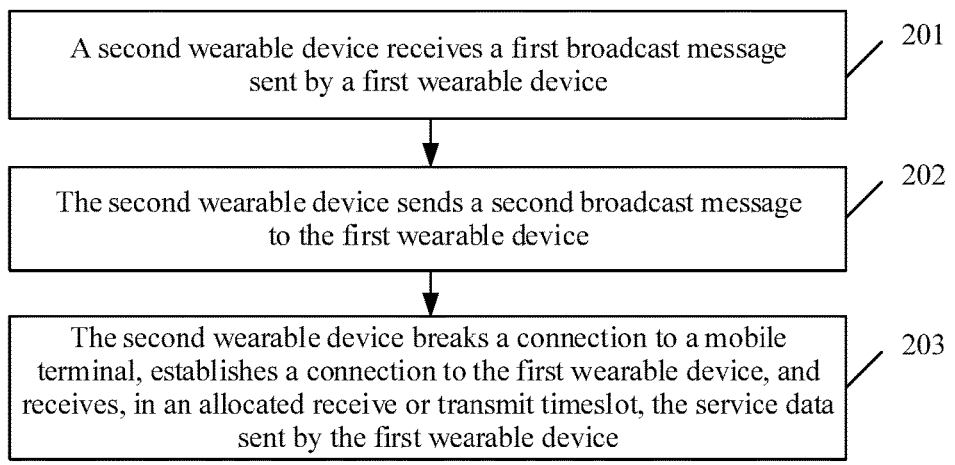

201 A second wearable device receives a first broadcast message sent by a first wearable device 202 The second wearable device sends a second broadcast message to the first wearable device 203 The second wearable device breaks a connection to a mobile terminal, establishes a connection to the first wearable device, and receives, in an allocated receive or transmit timeslot, the service data sent by the first wearable device

FIG. 7

DATA TRANSMISSION METHOD, DEVICE, AND SYSTEM

CROSS-REFERENCE TO RELATED APPLICATION

This application is a U.S. National Stage of International Patent Application No. PCT/CN2015/075723 filed on Apr. 1, 2015, which is hereby incorporated by reference in its entirety.

TECHNICAL FIELD

The present disclosure relates to the field of communications technologies, and in particular, to a data transmission method, device, and system.

BACKGROUND

As Internet technologies continuously become mature and hardware is developed toward miniaturization, large quantities of smart wearable devices (for example, smart watches, glasses, and bands) emerge. These wearable devices may be worn by people, and connected to mobile terminals having high intelligence (for example, smartphones and tablet computers) to form a personal area network centered on an individual person's workspace. In the personal area network, generally, a star topology (as shown in FIG. 1) is used. As shown in FIG. 1, a mobile terminal is used as a master device, and wearable devices (designated as wearable device A, wearable device B, wearable device C, wearable device D, and wearable device E) are used as slave devices. All the slave devices connect to the master device in BLUETOOTH low energy (BLE) mode, and set a time division multiplexing communication mode to transmit data in receive or transmit timeslots allocated by the master device (as shown in FIG. 2).

Featuring a simple structure, the conventional star topology of the personal area network is easy to maintain. However, because various wearable devices in the personal area network must establish connections to the mobile terminal, the network topology is fixed, and this is disadvantageous for data transmission in the personal area network in some cases and even causes network overheads to increase. For example, when a quantity of wearable devices connected to the mobile terminal is large, some urgent messages of certain wearable devices cannot be sent to the mobile terminal in time. For another example, when a wearable device B needs to send data to a wearable device A, the wearable device B must first send the data to the mobile terminal, and then the mobile terminal forwards the data to the wearable device A, causing the network overheads to increase. Therefore, to facilitate data transmission in the personal area network or reduce the network overheads, an appropriate adjustment of the network topology of the entire personal area network is quite necessary.

SUMMARY

Embodiments of the present disclosure provide a data transmission method, device, and system in order to provide a more flexible network topology and reduce network overheads.

To achieve the foregoing objective, the following technical solutions are adopted in the embodiments of the present disclosure.

According to a first aspect, an embodiment of the present disclosure provides a data transmission method, applied to a personal area network, where the personal area network includes a first wearable device, a second wearable device, and a mobile terminal, and the method includes sending, by the first wearable device, a first broadcast message to the second wearable device, where the first broadcast message is used to indicate that the first wearable device may establish a connection to another wearable device, determining whether the second wearable device supports processing of service data of the first wearable device if the first wearable device obtains by listening, a second broadcast message sent by the second wearable device, where the second broadcast message is used to indicate that the second wearable device has a BLUETOOTH hub function and may establish a connection to the first wearable device, and establishing a connection to the second wearable device if the first wearable device determines that the second wearable device supports processing of the service data, and sending the service data in an allocated receive or transmit timeslot to the second wearable device.

With reference to the first aspect, in a first possible implementation manner of the first aspect, determining whether the second wearable device supports processing of service data of the first wearable device includes sending, by the first wearable device, a query request message to the second wearable device, where the query request message is used to query service data supported by the second wearable device, receiving, by the first wearable device, a query response message returned by the second wearable device, where the query response message includes the service data supported by the second wearable device, and determining that the second wearable device supports processing of the service data if the service data supported by the second wearable device includes the service data of the first wearable device.

With reference to the first aspect or the first possible implementation manner of the first aspect, in a second possible implementation manner of the first aspect, before sending, by the first wearable device, a first broadcast message to the second wearable device, the method further includes detecting, by the first wearable device, quality of service when the first wearable device sends the service data to the mobile terminal, and determining that the quality of service does not meet a preset quality of service condition, where the quality of service includes a transmission delay and a transmission rate.

With reference to the second possible implementation manner of the first aspect, in a third possible implementation manner of the first aspect, the preset quality of service condition includes a preset transmission rate threshold and a preset transmission delay threshold, and that the quality of service does not meet a preset quality of service condition includes that the transmission delay is greater than the preset transmission delay threshold, the transmission rate is lower than the preset transmission rate threshold, or the transmission delay is greater than the preset transmission delay threshold, and the transmission rate is lower than the preset transmission rate threshold.

With reference to the first aspect or the first possible implementation manner of the first aspect, in a fourth possible implementation manner of the first aspect, before sending, by the first wearable device, a first broadcast message to the second wearable device, the method further includes receiving, by the first wearable device, a notification message sent by the mobile terminal, where the notification message includes a device identity and address information of the second wearable device and is used to notify the first wearable device that a final receiver of the service data is the second wearable device.

With reference to the first aspect or the first possible implementation manner of the first aspect, in a fifth possible implementation manner of the first aspect, before sending, by the first wearable device, a first broadcast message to the second wearable device, the method further includes detecting, by the first wearable device, that a final receiver of the service data is the second wearable device.

With reference to any one of the first aspect to the fifth possible implementation manner of the first aspect, in a sixth possible implementation manner of the first aspect, after establishing, by the first wearable device, a connection to the second wearable device, the method further includes receiving, by the first wearable device, a disconnection request message sent by the second wearable device, where the disconnection request message is used to request the first wearable device to break the connection to the second wearable device, and after breaking the connection to the second wearable device in response to the disconnection request message, receiving, by the first wearable device, a connection request message sent by the mobile terminal, establishing a connection to the mobile terminal, and receiving or transmitting the service data in an allocated receive or transmit timeslot.

According to a second aspect, an embodiment of the present disclosure provides a data transmission method, applied to a personal area network, where the personal area network includes a first wearable device, a second wearable device, and a mobile terminal, and the method includes receiving, by the second wearable device, a first broadcast message sent by the first wearable device, where the first broadcast message is used to indicate that the first wearable device may establish a connection to another wearable device, sending, by the second wearable device, a second broadcast message to the first wearable device, where the second broadcast message is used to indicate that the second wearable device has a BLUETOOTH hub function and may connect to the first wearable device, and establishing, by the second wearable device, a connection to the first wearable device, and receiving, in an allocated receive or transmit timeslot, the service data sent by the first wearable device.

With reference to the second aspect, in a first possible implementation manner of the second aspect, before establishing, by the second wearable device, a connection to the first wearable device, the method further includes receiving, by the second wearable device, a query request message sent by the first wearable device, where the query request message is used to query service data supported by the second wearable device, and sending, by the second wearable device, a query response message to the first wearable device, where the query response message includes the service data supported by the second wearable device such that the first wearable device determines, according to the service data supported by the second wearable device, that the second wearable device supports processing of the service data.

With reference to the second aspect or the first possible implementation manner of the second aspect, in a second possible implementation manner of the second aspect, after establishing, by the second wearable device, a connection to the first wearable device, the method further includes detecting, by the second wearable device in real time, whether the connection to the first wearable device needs to be broken, breaking the connection to the first wearable device if the connection to the first wearable device needs to be broken, and reporting address information and a device identity of the first wearable device to the mobile terminal such that the mobile terminal initiates a connection request message to the first wearable device according to the device identity and the address information, where the disconnection request message is used to request the first wearable device to break the connection to the second wearable device, and the connection request message is used to request the first wearable device to establish a connection to the mobile terminal.

With reference to the second possible implementation manner of the second aspect, in a third possible implementation manner of the second aspect, detecting, by the second wearable device in real time, whether the connection to the second wearable device needs to be broken, includes detecting remaining power of the second wearable device, and determining that the connection to the first wearable device needs to be broken if the remaining power is less than a preset remaining power threshold, detecting a remaining time resource after the mobile terminal allocates a time resource to each wearable device connected to the mobile terminal, and determining that the connection to the first wearable device needs to be broken if the remaining time resource is greater than or equal to a preset time resource threshold, or determining that the connection relationship with the first wearable device needs to be broken if a disconnection request message, sent by a user, for breaking the connection to the first wearable device is received.

According to a third aspect, an embodiment of the present disclosure provides a data transmission method, applied to a personal area network, where the personal area network includes a first wearable device, a second wearable device, and a mobile terminal, and the method includes detecting, by the mobile terminal, that service data sent by the first wearable device to the mobile terminal is service data to be forwarded by the mobile terminal, sending, by the mobile terminal, a notification message to the first wearable device, where the notification message includes a device identity and address information of the second wearable device and is used to notify the first wearable device that a final receiver of the service data is the second wearable device, receiving, by the mobile terminal, disconnection request information sent by the first wearable device, where the disconnection request message is used to request the mobile terminal to break a connection to the first wearable device, and breaking, by the mobile terminal, the connection to the first wearable device in response to the disconnection request message.

With reference to the third aspect, in a first possible implementation manner of the third aspect, after breaking, by the terminal, the connection to the first wearable device, the method further includes receiving, by the mobile terminal, address information and a device identity of the first wearable device that are reported by the second wearable device, initiating, by the mobile terminal, a connection request message to the first wearable device according to the device identity and the address information, where the connection request message is used to request to establish a connection to the first wearable device, and reestablishing, by the mobile terminal, a connection to the first wearable device.

According to a fourth aspect, an embodiment of the present disclosure provides a wearable device, including a sending unit configured to send a first broadcast message to the second wearable device, where the first broadcast message is used to indicate that the wearable device may establish a connection to another wearable device, a receiving unit configured to listen for a second broadcast message sent by the second wearable device to the wearable device, where the second broadcast message is used to indicate that the second wearable device has a BLUETOOTH hub function and may establish a connection to the wearable device, a determining unit configured to determine, after the receiving unit obtains the second broadcast message by listening, whether the second wearable device supports processing of service data of the wearable device, and a connection unit configured to break a connection to the mobile terminal, and establish a connection to the second wearable device after the determining unit determines that the second wearable device supports processing of the service data, where the sending unit is further configured to send the service data in an allocated receive or transmit timeslot to the second wearable device after the connection unit establishes the connection to the second wearable device.

With reference to the fourth aspect, in a first possible implementation manner of the fourth aspect, the sending unit is further configured to send a query request message to the second wearable device, where the query request message is used to query service data supported by the second wearable device. The receiving unit is further configured to receive a query response message returned by the second wearable device, where the query response message includes the service data supported by the second wearable device, and the determining unit is further configured to determine, if the service data supported by the second wearable device in the query response message includes the service data of the wearable device, that the second wearable device supports processing of the service data.

With reference to the fourth aspect or the first possible implementation manner of the fourth aspect, in a second possible implementation manner of the fourth aspect, the wearable device further includes a detection unit configured to detect, before the sending unit sends the first broadcast message to the second wearable device, quality of service when the first wearable device sends the service data to the mobile terminal, and the determining unit is further configured to determine that the quality of service does not meet a preset quality of service condition, where the quality of service includes a transmission delay and a transmission rate.

With reference to the second possible implementation manner of the fourth aspect, in a third possible implementation manner of the fourth aspect, that the quality of service does not meet a preset quality of service condition includes that the transmission delay is greater than a preset transmission delay threshold, the transmission rate is lower than a preset transmission rate threshold, or the transmission delay is greater than a preset transmission delay threshold, and the transmission rate is lower than a preset transmission rate threshold.

With reference to the fourth aspect or the second possible implementation manner of the fourth aspect, in a fourth possible implementation manner of the fourth aspect, the receiving unit is further configured to receive, before the sending unit sends the first broadcast message to the second wearable device, a notification message sent by the mobile terminal, where the notification message includes a device identity and address information of the second wearable device and is used to notify the wearable device that a final receiver of the service data is the second wearable device.

With reference to the fourth aspect or the first possible implementation manner of the fourth aspect, in a fifth possible implementation manner of the fourth aspect, the wearable device further includes a second detection unit configured to detect, before the sending unit sends the first broadcast message to the second wearable device, that a final receiver of the service data is the second wearable device.

With reference to any one of the fourth aspect to the fifth possible implementation manner of the fourth aspect, in a sixth possible implementation manner of the fourth aspect, the receiving unit is further configured to receive, after the first wearable device establishes the connection to the second wearable device, a disconnection request message sent by the second wearable device, where the disconnection request message is used to request the wearable device to break the connection to the second wearable device. The connection unit is further configured to break the connection to the second wearable device after the receiving unit receives the disconnection request message. The receiving unit is further configured to receive a connection request message sent by the mobile terminal, where the connection request message is used to request the wearable device to establish a connection to the mobile terminal, the connection unit is further configured to establish the connection to the mobile terminal after the receiving unit receives the connection request message, and the sending unit is further configured to receive or transmit the service data in an allocated receive or transmit timeslot after the connection unit establishes the connection to the mobile terminal.

According to a fifth aspect, an embodiment of the present disclosure provides a wearable device, including a receiving unit configured to receive a first broadcast message sent by the first wearable device, where the first broadcast message is used to indicate that the first wearable device may establish a connection to another wearable device, a sending unit configured to send a second broadcast message to the first wearable device after the receiving unit receives the first broadcast message, where the second broadcast message is used to indicate that the second wearable device has a BLUETOOTH hub function and may connect to the first wearable device, and a connection unit configured to establish a connection to the first wearable device after the sending unit sends the second broadcast message, where the receiving unit is further configured to receive, in an allocated receive or transmit timeslot, the service data sent by the first wearable device after the connection unit establishes the connection to the first wearable device.

With reference to the fifth aspect, in a first possible implementation manner of the fifth aspect, the receiving unit is further configured to receive, before the connection unit establishes the connection to the first wearable device, a query request message sent by the first wearable device, where the query request message is used to query service data supported by the wearable device, and the sending unit is further configured to send a query response message to the first wearable device, where the query response message includes the service data supported by the wearable device such that the first wearable device determines, according to the service data supported by the wearable device, that the wearable device supports processing of the service data.

With reference to the fifth aspect or the first possible implementation manner of the fifth aspect, in a second possible implementation manner of the fifth aspect, the wearable device further includes a first detection unit configured to detect in real time, after the second wearable device establishes the connection to the first wearable device, whether the connection to the first wearable device needs to be broken. The connection unit is further configured to break the connection to the first wearable device if the detection unit detects that the first wearable device needs to break the connection to the first wearable device, and the sending unit is further configured to report address information and a device identity of the first wearable device to the mobile terminal such that the mobile terminal initiates a connection request message to the first wearable device according to the device identity and the address information, where the disconnection request message is used to request the first wearable device to break the connection to the wearable device, and the connection request message is used to request the first wearable device to establish a connection to the mobile terminal.

With reference to the second possible implementation manner of the fifth aspect, in a third possible implementation manner of the fifth aspect, the detection unit is further configured to detect remaining power of the wearable device, and determine that the connection to the first wearable device needs to be broken if the remaining power is less than a preset remaining power threshold, detect a remaining time resource after the mobile terminal allocates a time resource to each wearable device connected to the mobile terminal, and determine that the connection to the first wearable device needs to be broken if the remaining time resource is greater than or equal to a preset time resource threshold, or determine that the connection relationship with the first wearable device needs to be broken if a disconnection request message, sent by a user, for breaking the connection to the first wearable device is received.

According to a sixth aspect, an embodiment of the present disclosure provides a mobile terminal, including a detection unit configured to detect that service data sent by a first wearable device to the mobile terminal is service data to be forwarded by the mobile terminal, a sending unit configured to send a notification message to the first wearable device when the detection unit detects that the service data is the data to be forwarded, where the notification message includes a device identity and address information of a second wearable device and is used to notify the first wearable device that a final receiver of the service data is the second wearable device, a receiving unit configured to receive disconnection request information sent by the first wearable device, where the disconnection request message is used to request the mobile terminal to break a connection to the first wearable device, and a connection unit configured to break the connection to the first wearable device in response to the disconnection request message received by the receiving unit.

With reference to the sixth aspect, in a first possible implementation manner of the sixth aspect, the receiving unit is further configured to receive, after the connection unit breaks the connection to the first wearable device, address information and a device identity of the first wearable device that are reported by the second wearable device. The sending unit is further configured to initiate a connection request message to the first wearable device according to the device identity and the address information, where the connection request message is used to request to establish a connection to the first wearable device, and the connection unit is further configured to reestablish a connection to the first wearable device.

According to a seventh aspect, an embodiment of the present disclosure provides a wearable device, including a communications unit configured to send a first broadcast message to the second wearable device, and listen for a second broadcast message sent by the second wearable device to the wearable device, where the first broadcast message is used to indicate that the wearable device may establish a connection to another wearable device, and the second broadcast message is used to indicate that the second wearable device has a BLUETOOTH hub function and may establish a connection to the wearable device, and a processor configured to determine, after the communications unit obtains the second broadcast message by listening, whether the second wearable device supports processing of service data of the wearable device, where the communications unit is further configured to establish a connection to the second wearable device, and send the service data in an allocated receive or transmit timeslot to the second wearable device after the processor determines that the second wearable device supports processing of the service data.

With reference to the seventh aspect, in a first possible implementation manner of the seventh aspect, the communications unit is further configured to send a query request message to the second wearable device, and receive a query response message returned by the second wearable device, where the query request message is used to query service data supported by the second wearable device, and the query response message includes the service data supported by the second wearable device, and the processor is further configured to determine, if the service data supported by the second wearable device in the query response message received by the communications unit includes the service data of the wearable device, that the second wearable device supports processing of the service data.

With reference to the seventh aspect or the first possible implementation manner of the seventh aspect, in a second possible implementation manner of the seventh aspect, the processor is further configured to detect quality of service when the first wearable device sends the service data to the mobile terminal, and determine that the quality of service does not meet a preset quality of service condition before the communications unit sends the first broadcast message to the second wearable device, where the quality of service includes a transmission delay and a transmission rate.

With reference to the second possible implementation manner of the seventh aspect, in a third possible implementation manner of the seventh aspect, that the quality of service does not meet a preset quality of service condition includes that the transmission delay is greater than a preset transmission delay threshold, the transmission rate is lower than a preset transmission rate threshold, or the transmission delay is greater than a preset transmission delay threshold, and the transmission rate is lower than a preset transmission rate threshold.

With reference to the seventh aspect or the first possible implementation manner of the seventh aspect, in a fourth possible implementation manner of the seventh aspect, the communications unit is further configured to receive, before the communications unit sends the first broadcast message to the second wearable device, a notification message sent by the mobile terminal, where the notification message includes a device identity and address information of the second wearable device and is used to notify the wearable device that a final receiver of the service data is the second wearable device.

With reference to the seventh aspect or the first possible implementation manner of the seventh aspect, in a fifth possible implementation manner of the seventh aspect, the processor is further configured to detect, before the communications unit sends the first broadcast message to the second wearable device, that a final receiver of the service data is the second wearable device.

With reference to any one of the seventh aspect to the fifth possible implementation manner of the seventh aspect, in a sixth possible implementation manner of the seventh aspect, the communications unit is further configured to receive a disconnection request message sent by the second wearable device, and break the connection to the second wearable device after the communications unit establishes the connection to the second wearable device, and receive a connection request message sent by the mobile terminal, establish a connection to the mobile terminal, and receive or transmit the service data in an allocated receive or transmit timeslot, where the connection request message is used to request the wearable device to establish the connection to the mobile terminal.

According to an eighth aspect, an embodiment of the present disclosure provides a wearable device, including a communications unit configured to receive a first broadcast message sent by a first wearable device, where the first broadcast message is used to indicate that the first wearable device may establish a connection to another wearable device, and a processor configured to generate a second broadcast message, where the second broadcast message is used to indicate that the second wearable device has a BLUETOOTH hub function and may connect to the first wearable device, where the communications unit is further configured to send the second broadcast message to the first wearable device, establish a connection to the first wearable device, and receive, in an allocated receive or transmit timeslot, the service data sent by the first wearable device.

With reference to the eighth aspect, in a first possible implementation manner of the eighth aspect, the communications unit is further configured to receive, before the communications unit establishes the connection to the first wearable device, a query request message sent by the first wearable device, where the query request message is used to query service data supported by the wearable device. The processor is further configured to generate a query response message, where the query response message includes the service data supported by the wearable device, and the communications unit is further configured to send the query response message to the first wearable device such that the first wearable device determines, according to the service data supported by the wearable device, that the wearable device supports processing of the service data.

With reference to the eighth aspect or the first possible implementation manner of the eighth aspect, in a second possible implementation manner of the eighth aspect, the processor is further configured to detect in real time, after the communications unit establishes the connection to the first wearable device, whether the communications unit needs to break the connection to the first wearable device, and the communications unit is further configured to break the connection to the first wearable device if the processor detects that the communications unit needs to break the connection to the first wearable device, and report address information and a device identity of the first wearable device to the mobile terminal such that the mobile terminal initiates a connection request message to the first wearable device according to the device identity and the address information, where the connection request message is used to request the first wearable device to establish a connection to the mobile terminal.

With reference to the second possible implementation manner of the eighth aspect, in a third possible implementation manner of the eighth aspect, the processor is further configured to detect remaining power of the wearable device, and determine that the connection to the first wearable device needs to be broken if the remaining power is less than a preset remaining power threshold, detect a remaining time resource after the mobile terminal allocates a time resource to each wearable device connected to the mobile terminal, and determine that the connection to the first wearable device needs to be broken if the remaining time resource is greater than or equal to a preset time resource threshold, or determine that the connection relationship with the first wearable device needs to be broken if a disconnection request message, sent by a user, for breaking the connection to the first wearable device is received.

According to a ninth aspect, an embodiment of the present disclosure provides a mobile terminal, including a processor configured to detect that service data sent by a first wearable device to the mobile terminal is service data to be forwarded by the mobile terminal, and a communications unit configured to send a notification message to the first wearable device, receive disconnection request information sent by the first wearable device, and break a connection to the first wearable device when the processor detects that the service data is the data to be forwarded, where the notification message includes a device identity and address information of a second wearable device and is used to notify the first wearable device that a final receiver of the service data is the second wearable device, and the disconnection request message is used to request the mobile terminal to break the connection to the first wearable device.

With reference to the ninth aspect, in a first possible implementation manner of the ninth aspect, after the communications unit breaks the connection to the first wearable device, the communications unit is further configured to receive address information and a device identity of the first wearable device that are reported by the second wearable device, initiate a connection request message to the first wearable device according to the device identity and the address information, and reestablish a connection to the first wearable device, where the connection request message is used to request to establish a connection to the first wearable device.

As can be known from above, the embodiments of the present disclosure provide a data transmission method, device, and system. After a first wearable device obtains by listening, a second broadcast message sent by a second wearable device and determines that the second wearable device supports processing of service data of the first wearable device, the first wearable device breaks a connection to a mobile terminal, establishes a connection to the second wearable device, and sends data in an allocated receive or transmit timeslot to the second wearable device. In this way, wearable devices are interconnected, a star network topology of a personal area network is adjusted to a daisy chain network topology, a more flexible network topology is provided, and network overheads are reduced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 6 is a schematic diagram of another channel index pattern according to an embodiment of the present disclosure;

FIG. 7 is a flowchart of another data transmission method according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figures 1, 2:
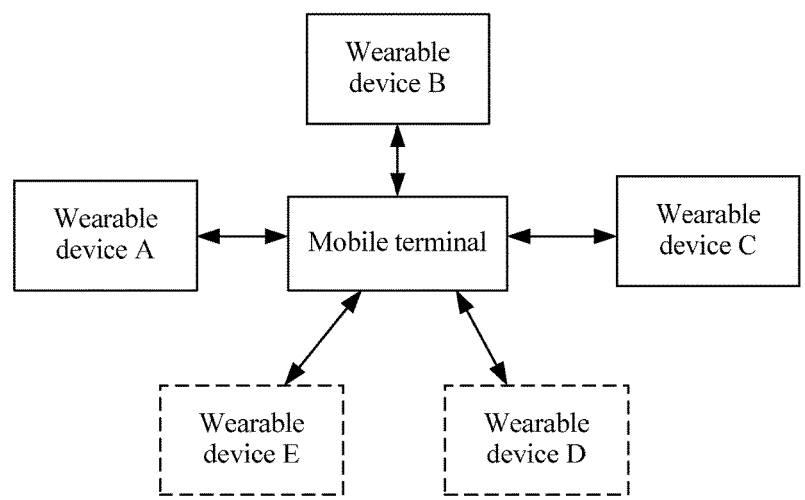
FIG. 1 is a schematic diagram of a conventional star network topology.
FIG. 2 is a schematic diagram of a channel index pattern.

A data transmission method provided by the embodiments of the present disclosure may be applied to a personal area network shown in FIG. 1. In the personal area network, a mobile terminal, as a master device, may connect to a wearable device A, a wearable device B, a wearable device C, a wearable device D, and a wearable device E in BLE mode. In addition, each wearable device uses a time division multiplexing mode to receive or transmit service data in a receive or transmit timeslot allocated by the mobile terminal.

The mobile terminal may be a terminal device having high intelligence, such as a mobile phone, a tablet computer, a notebook computer, an ultra-mobile personal computer (UMPC), a netbook, or a personal digital assistant (PDA). The wearable devices may be smart watches, smart glasses, bands, earphones, fancy accessories, finger rings, and electronic devices that are integrated with clothes, trousers, shoes, socks, helmets, and caps and connected to the mobile terminal. In BLUETOOTH version 4.1 released by the Core Specification Working Group (CSWG) in a BLUETOOTH standardization organization—BLUETOOTH Special Interest Group (BT SIG) in December 2013, a wearable device having high intelligence, such as a smart watch or smart glasses (named a second wearable device for ease of description in the embodiments of the present disclosure), is specified as a device that has a BLUETOOTH hub function and integrates basic functions of a mobile terminal and an ordinary wearable device. When connected to a mobile terminal as a slave device, the wearable device having high intelligence may, like the mobile terminal, act as a master device to connect to another wearable device in BLE mode. Therefore, in the personal area network having a star topology, a wearable device having a special requirement (for example, a low delay) can break its connection to the mobile terminal according to its own data transmission requirement, and connect to this wearable device.

Figure 3:
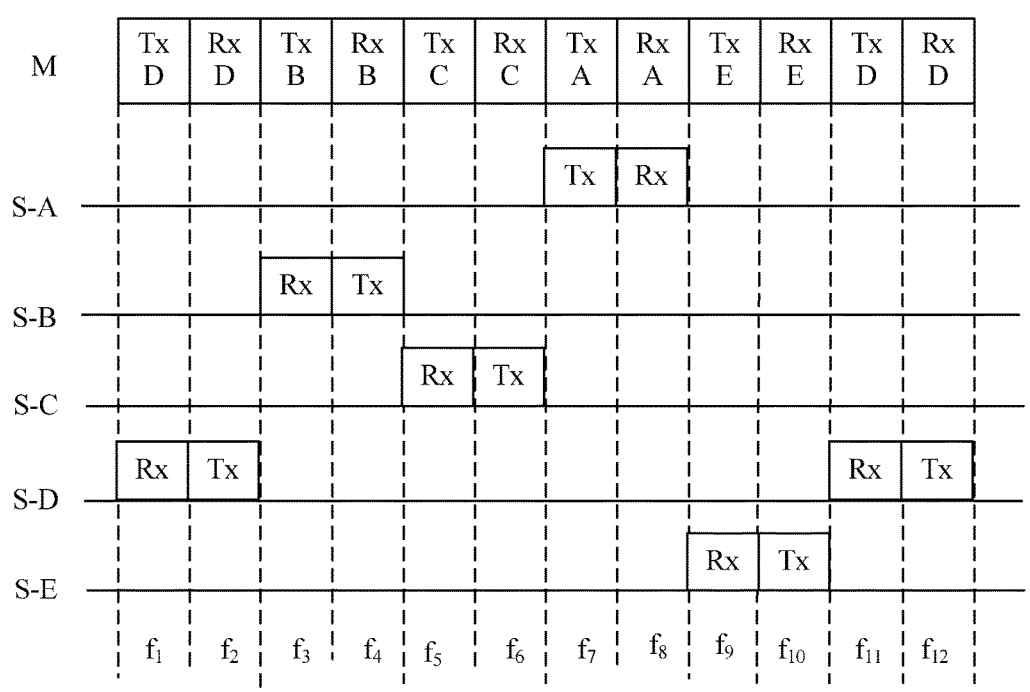
FIG. 3 is a schematic diagram of another channel index pattern.

For example, in the personal area network having a star topology as shown in FIG. 1, when only the wearable device A, the wearable device B, and the wearable device C are connected to the mobile terminal, receive and transmit timeslots allocated by the mobile terminal to the wearable devices are shown in FIG. 2. When a quantity of wearable devices connected to the mobile terminal increases, for example, when the wearable device A, the wearable device B, the wearable device C, the wearable device D, and the wearable device E are connected, receive and transmit timeslots allocated by the mobile terminal to the wearable devices are shown in FIG. 3. It can be known by comparing FIG. 2 with FIG. 3 that after the wearable device D and the wearable device E are added as wearable devices connected to the mobile terminal, receive and transmit timeslots allocated to the wearable device A, the wearable device B, and the wearable device C are reduced obviously. If the wearable device B and the wearable device C need to transmit a large amount of data to each other through the mobile terminal, a transmission delay between the wearable device B and the wearable device C increases, and a transmission rate is reduced.

Figure 5:
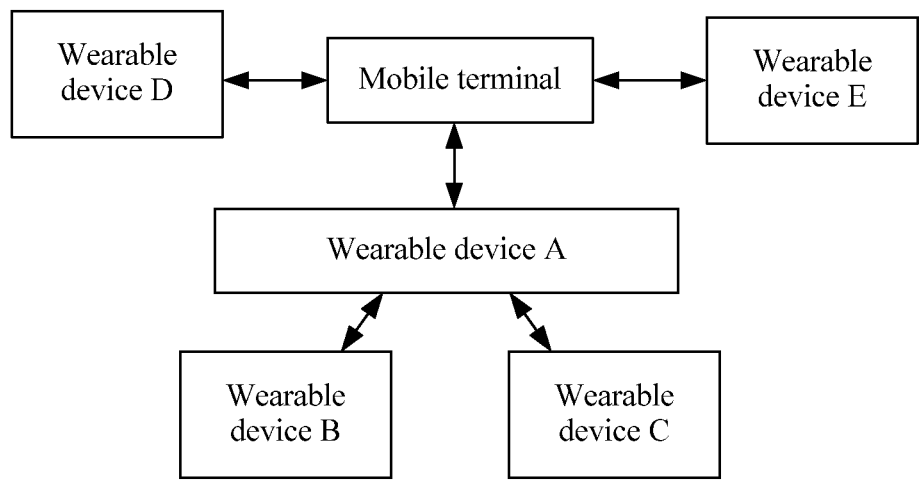
FIG. 5 is a schematic networking diagram of a personal area network according to an embodiment of the present disclosure.

In this case, to meet transmission requirements of the wearable device B and the wearable device C, the wearable device B and the wearable device C may use a data transmission method provided by the embodiments of the present disclosure to break their connections to the mobile terminal and connect to a device having a BLUETOOTH hub function (as shown in FIG. 5), and use receive or transmit timeslots allocated by the device (as shown in FIG. 6) to continue to transmit data. The data transmission methods provided by the embodiments of the present disclosure are hereinafter described in detail.

Embodiment 1

Figure 4:
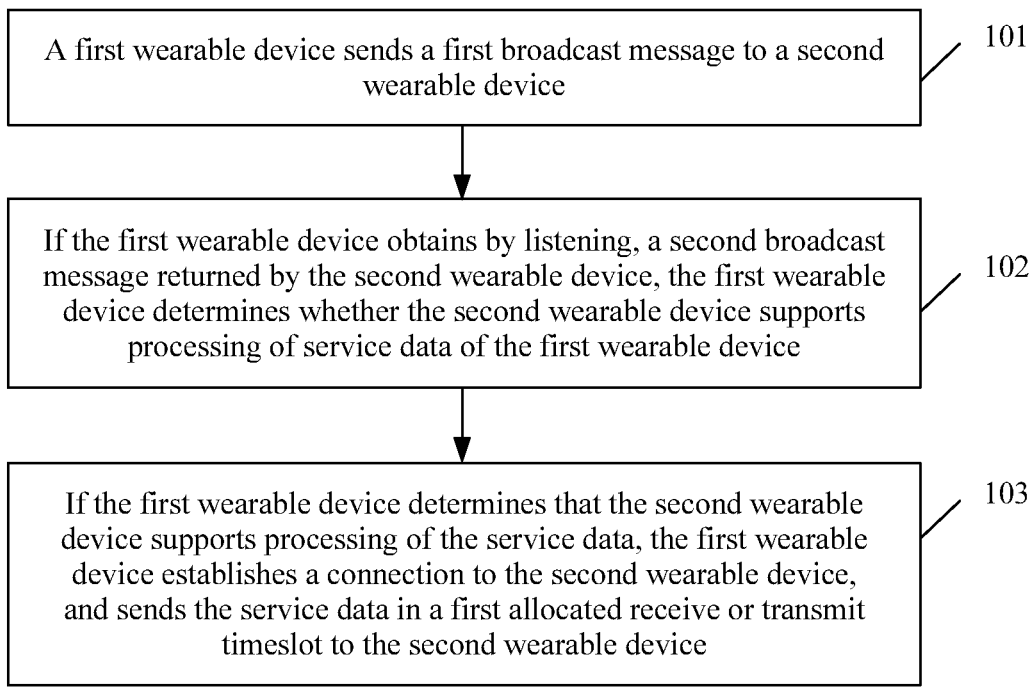
FIG. 4 is a flowchart of a data transmission method according to an embodiment of the present disclosure.

FIG. 4 shows a flowchart of a data transmission method provided by this embodiment of the present disclosure. The method is applied to a first wearable device in a personal area network. Referring to FIG. 4, the method may include the following steps.

Step 101: A first wearable device sends a first broadcast message to a second wearable device.

The first wearable device may be any wearable device connected to a master device (such as a mobile terminal) in a personal area network. The second wearable device may be any wearable device in the personal area network except the first wearable device connected to the master device.

The first broadcast message is used to indicate that the first wearable device may establish a connection to another wearable device, and may be sent by global broadcast to all wearable devices including the second wearable device in the personal area network, or may be sent by directed broadcast to only the second wearable device.

For example, assuming that the wearable device B in FIG. 1 is the first wearable device, and that the wearable device A is the second wearable device, the wearable device B may send the first broadcast message to the wearable device A, the wearable device C, the wearable device D, and the wearable device E in the personal area network, or may send the first broadcast message to the wearable device A in a directed manner. It should be noted that, which specific type of broadcast message the first broadcast message is may be determined according to processing of the first wearable device before step 101.

Afterward, the first wearable device always listens for whether the second wearable device sends a second broadcast message to the first wearable device. If a second broadcast message is sent, it indicates that the second wearable device is a device having a BLUETOOTH hub function and may establish a connection to the first wearable device, and step 102 is performed.

If no second broadcast message is returned, it indicates that the second wearable device does not have the BLUETOOTH hub function, and the first wearable device cannot establish a connection to the second wearable device. In this case, execution of a method for adjusting a topology of the personal area network according to this embodiment of the present disclosure is terminated.

Step 102: If the first wearable device obtains by listening, a second broadcast message returned by the second wearable device, the first wearable device determines whether the second wearable device supports processing of service data of the first wearable device.

The second broadcast message is used to indicate that the second wearable device has the BLUETOOTH hub function and may connect to the first wearable device.

Although in this case, the first wearable device has determined that the second wearable device is a device having the BLUETOOTH hub function and may establish a connection to the first wearable device to ensure that the service data of the first wearable device, after being sent to the second wearable device, can be processed by the second wearable device, in this embodiment, the first wearable device further needs to determine whether the second wearable device supports processing of the service data of the first wearable device.

The first wearable device sends a query request message to the second wearable device, where the query request message is used to query service data supported by the second wearable device. The first wearable device receives a query response message returned by the second wearable device, where the query response message includes the service data supported by the second wearable device, and if the service data supported by the second wearable device includes the service data of the first wearable device, the first wearable device determines that the second wearable device supports processing of the service data, that is, the second wearable device may parse the service data, and step 103 is performed, or if the service data supported by the second wearable device does not include the service data of the first wearable device, the first wearable device determines that the second wearable device does not support processing of the service data, that is, the second wearable device cannot parse the service data, and even if a transmission delay of the service data increases, the first wearable device cannot establish a connection to the second wearable device.

Service data of a wearable device is generated by a service supported by the wearable device. Each service supported by the wearable device corresponds to a specific piece of service data. For example, if sports shoes may support services such as heart rate measurement, and running speed and cadence measurement, service data that may be generated by the sports shoes may include heart rate measurement service data, and running speed and cadence service (RSCS) data. Each service includes at least one feature, and service data corresponding to the feature has a defined specific data structure, and includes elements such as a feature name, a feature value, a feature value unit, and a data type. In this embodiment, the service data of the first wearable device may be service data that is already sent to the mobile terminal but is not sent successfully, or may be service data that does not meet some quality conditions or the like during sending and will be sent to the mobile terminal.

For example, service data being transmitted between a first wearable device that is sports shoes and the mobile terminal is RSCS data, service data being transmitted between a first wearable device that is an anti-loss tag and the mobile terminal is immediate alert service (IAS) data. In this case, if types of service data supported by the second wearable device include RSCS, IAS, and temperature and humidity services, the sports shoes and the anti-loss tag respectively determine, after receiving a query response message sent by the second wearable device, that the second wearable device supports processing of the RSCS and the IAS. If types of service data supported by the second wearable device include IAS and temperature and humidity services, after the sports shoes and the anti-loss tag respectively receive a query response message sent by the second wearable device, the sports shoes determine that the second wearable device does not support processing of the service data transmitted between the sports shoes and the mobile terminal, and therefore, the sports shoes terminate establishment of a connection to the second wearable device.

Step 103: If the first wearable device determines that the second wearable device supports processing of the service data, the first wearable device establishes a connection to the second wearable device, and sends the service data in an allocated receive or transmit timeslot to the second wearable device.

The first wearable device may establish a BLE connection to the second wearable device by performing three existing processes of discovery, pairing, and connection establishment. Details are not described herein.

It should be noted that, in this embodiment of the present disclosure, when the first wearable device establishes the connection to the second wearable device, the first wearable device may still maintain a connection relationship with the mobile terminal, but they do not communicate each other.

Alternatively, the first wearable device may break a connection relationship with the mobile terminal. For example, in the personal area network shown in FIG. 1, after the wearable device B (the first wearable device) determines that the wearable device A (the second wearable device) supports processing of service data of the wearable device B, the wearable device B breaks a connection to the mobile terminal, connects to the wearable device A (as shown in FIG. 5), and sends, to the wearable device A, the service data in a receive or transmit timeslot (as shown in FIG. 6) allocated by the wearable device A.

The receive or transmit timeslot is different from a receive or transmit timeslot allocated by the mobile terminal, and may be allocated by the second wearable device, or may be allocated by the first wearable device.

Optionally, when receive or transmit timeslots allocated to the first wearable device are reduced because a quantity of wearable devices connected to the mobile terminal increases, and consequentially, the service data transmitted by the first wearable device cannot meet a quality of service requirement (for example, a low delay), the first wearable device may require that a quantity of receive or transmit timeslots allocated by the second wearable device should be greater than a quantity of receive or transmit timeslots allocated by the mobile terminal to the first wearable device in order to meet the quality of service requirement.

For example, as can be known from comparison between FIG. 3 and FIG. 6, receive or transmit timeslots allocated by the wearable device A to the wearable device B are more than receive or transmit timeslots allocated by the mobile terminal to the wearable device B, and frequency resources occupied by the wearable device B for sending data to the wearable device A are the same as frequency resources occupied by other wearable devices for sending data to the mobile terminal, that is, for different master devices, data is transmitted in frequency division multiplexing mode between wearable devices connected to the master devices. In this way, when quality of service of the transmitted data is met, utilization of frequency resources is also greatly increased.

Optionally, in this embodiment of the present disclosure, if the service data transmitted by the first wearable device cannot meet the quality of service requirement because the receive or transmit timeslots allocated to the first wearable device are reduced due to the increase of wearable devices connected to the mobile terminal, the foregoing method may be performed, that is, before step 101, the method may further include detecting, by the first wearable device, quality of service of the service data, and determining that the quality of service does not meet a preset quality of service condition, where the quality of service includes a transmission delay and a transmission rate, the preset quality of service condition includes a preset transmission rate threshold and a preset transmission delay threshold, and that the quality of service does not meet a preset quality of service condition may include that the transmission delay is greater than the preset transmission delay threshold, the transmission rate is lower than the preset transmission rate threshold, or the transmission delay is greater than the preset transmission delay threshold, and the transmission rate is lower than the preset transmission rate threshold.

It should be noted that, the preset transmission delay threshold and the preset transmission rate threshold are set according to a requirement of the transmitted service data, and are not limited in this embodiment of the present disclosure.

In this case, correspondingly, the first broadcast message in step 101 may be a global broadcast message, and sent to each wearable device in the personal area network.

In addition, in this embodiment of the present disclosure, the foregoing method may also be performed when there is a session of upper-layer transmission of service data between the first wearable device and the second wearable device in order to reduce network overheads, that is, for a certain application service, a sender of the service data is the first wearable device, and a final receiver of the service data is the second wearable device. If the original star network topology is maintained, the first wearable device cannot directly communicate with the second wearable device, and all communication data needs to be forwarded by the mobile terminal, causing unnecessary network overheads to increase.

Therefore, in this embodiment of the present disclosure, before step 101, the method may further include receiving, by the first wearable device, a notification message sent by the mobile terminal, where the notification message includes a device identity and address information of the second wearable device and is used to notify the first wearable device that a final receiver of the service data is the second wearable device, or detecting, by the first wearable device, that a final receiver of the service data is the second wearable device.

Correspondingly, the first broadcast message in step 101 is a directed broadcast message sent to only the second wearable device.

It should be noted that, the final receiver in this embodiment of the present disclosure may refer to a device that does not forward service data to another device after receiving the service data.

For example, after the mobile terminal receives service data, if the service data is not forwarded to another device, the mobile terminal is a final receiver of the service data, and if the service data is forwarded to the second wearable device, but the second wearable device does not forward the service data to another device, the second wearable device is a final receiver of the service data.

Because the second wearable device used as a BLUETOOTH hub is limited by a device size, a battery capacity of the second wearable device is far less than a battery capacity of the mobile terminal used as a master device, and especially after the second wearable device used as a master device is connected to the first wearable device, power consumption of the second wearable device is relatively fast, and this affects use of the second wearable device. In addition, although the second wearable device having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, a service of the first wearable device connected to the second wearable device needs to be migrated to the mobile terminal when appropriate. For example, when the quantity of wearable devices connected to the mobile terminal is not large and available timeslot resources are relatively sufficient, the first wearable device may consider breaking the connection to the second wearable device and establish a connection to the mobile terminal, and then a daisy chain network topology is changed to a star network topology. Specific implementation is as follows.

The first wearable device receives a disconnection request message sent by the second wearable device, where the disconnection request message is used to request the first wearable device to break the connection to the second wearable device, and after breaking the connection to the second wearable device in response to the disconnection request message, the first wearable device receives a connection request message sent by the mobile terminal, reestablishes a connection to the mobile terminal, and receives or transmits the service data in an allocated receive or transmit timeslot.

Optionally, herein the receive or transmit timeslot may be allocated by the mobile terminal or allocated by the second wearable device.

For example, the wearable device B and the wearable device C connected to the wearable device A as shown in FIG. 5 respectively break a connection to the wearable device A, and still connect to the mobile terminal (as shown in FIG. 1), and the wearable device B or the wearable device C receives or transmits service data using a corresponding receive or transmit timeslot in a channel index pattern shown in FIG. 3.

This embodiment of the present disclosure provides a data transmission method. After a first wearable device obtains by listening, a second broadcast message sent by a second wearable device and determines that the second wearable device supports processing of service data of the first wearable device, the first wearable device establishes a connection to the second wearable device, and sends the data in an allocated receive or transmit timeslot to the second wearable device. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between the first wearable device and the second wearable device, the first wearable device establishes a connection to the second wearable device directly, and transmits the data to the second wearable device without using the mobile terminal for forwarding, and network overheads are reduced greatly.

Embodiment 2

FIG. 7 shows another data transmission method provided by this embodiment of the present disclosure. As shown in FIG. 7, the method may include the following steps.

Step 201: A second wearable device receives a first broadcast message sent by a first wearable device.

The first broadcast message is used to indicate that the first wearable device may establish a connection to another wearable device, and may be sent by global broadcast to all wearable devices including the second wearable device in a personal area network, or may be sent by directed broadcast to only the second wearable device.

Step 202: The second wearable device sends a second broadcast message to the first wearable device.

The second broadcast message is used to indicate that the second wearable device has a BLUETOOTH hub function and may connect to the first wearable device.

Step 203: The second wearable device breaks a connection to a mobile terminal, establishes a connection to the first wearable device, and receives, in an allocated receive or transmit timeslot, the service data sent by the first wearable device.

The second wearable device may establish a BLE connection to the first wearable device by performing three existing processes of discovery, pairing, and connection establishment. Details are not described herein.

The receive or transmit timeslot is different from a receive or transmit timeslot allocated by the mobile terminal, and may be allocated by the second wearable device, or may be allocated by the first wearable device.

Optionally, when receive or transmit timeslots allocated to the first wearable device are reduced because a quantity of wearable devices connected to the mobile terminal increases, and consequentially, the service data transmitted by the first wearable device cannot meet a quality of service requirement (for example, a low delay), the first wearable device may require that a quantity of receive or transmit timeslots allocated by the second wearable device should be greater than a quantity of receive or transmit timeslots allocated by the mobile terminal to the first wearable device in order to meet the quality of service requirement. For example, as can be known from comparison between FIG. 3 and FIG. 6, receive or transmit timeslots allocated by the wearable device A to the wearable device B are more than receive or transmit timeslots allocated by the mobile terminal to the wearable device B, and frequency resources occupied by the wearable device B for sending data to the wearable device A are the same as frequency resources occupied by other wearable devices for sending data to the mobile terminal, that is, for different master devices, data is transmitted in frequency division multiplexing mode between wearable devices connected to the master devices. In this way, when quality of service of the transmitted data is met, utilization of frequency resources is also greatly increased.

Optionally, to ensure that service data transmitted between the first wearable device and the mobile terminal can be processed by the second wearable device after the first wearable device is connected to the second wearable device, before step 203 in which the second wearable device establishes the connection to the first wearable device, the method may further include receiving, by the second wearable device, a query request message sent by the first wearable device, where the query request message is used to query service data supported by the second wearable device, and sending, by the second wearable device, a query response message to the first wearable device, where the query response message includes the service data supported by the second wearable device such that the first wearable device determines, according to the service data supported by the second wearable device, that the second wearable device supports processing of the service data.

Because the second wearable device used as a BLUETOOTH hub is limited by a device size, a battery capacity of the second wearable device is far less than a battery capacity of the mobile terminal used as a master device, and especially after the second wearable device used as a master device is connected to the first wearable device, power consumption of the second wearable device is relatively fast, and this affects use of the second wearable device. In addition, although the second wearable device having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, a service of the first wearable device connected to the second wearable device in the personal area network needs to be migrated. For example, when the quantity of wearable devices connected to the mobile terminal is not large and available timeslot resources are relatively sufficient, the first wearable device may break the connection to the second wearable device and establish a connection to the mobile terminal, and then a daisy chain network topology is changed to a star network topology. Specific implementation is as follows.

The second wearable device detects in real time, whether the connection to the first wearable device needs to be broken, breaks the connection to the first wearable device if determining that the connection to the first wearable device needs to be broken, and reports address information and a device identity of the first wearable device to the mobile terminal such that the mobile terminal initiates a connection request message to the first wearable device according to the device identity and the address information, where the disconnection request message is used to request the first wearable device to break the connection to the second wearable device, and the connection request message is used to request the first wearable device to establish a connection to the mobile terminal.

For example, the second wearable device may determine, in any one or more of the following manners (1), (2), and (3), whether the connection to the first wearable device needs to be broken.

(1) Detect remaining power of the second wearable device, and if the remaining power is less than a preset remaining power threshold, determine that the connection to the first wearable device needs to be broken.

The preset remaining power threshold may be set according to a requirement, and is not limited in this embodiment of the present disclosure. If the remaining power is less than the preset remaining power threshold, it indicates that power of the second wearable device is consumed excessively, and possibly cannot support subsequent service data reception or transmission by the first wearable device. If the remaining power is greater than the preset remaining power threshold, it indicates that power of the second wearable device is relatively sufficient, and may meet a power requirement of the first wearable device for receiving or transmitting the service data.

(2) Detect a remaining time resource after the mobile terminal allocates a time resource to each wearable device connected to the mobile terminal, and if the remaining time resource is greater than or equal to a preset time resource threshold, determine that the connection to the first wearable device needs to be broken.

The preset time resource threshold may be set according to a requirement, and is not limited in this embodiment of the present disclosure. If the remaining time resource is greater than or equal to the preset time resource threshold, it indicates that an existing time resource of the mobile terminal may meet a transmission delay requirement of the first wearable device, that is, when the first wearable device is connected to the mobile terminal and receives or transmits the service data, a transmission delay is not increased. If the remaining time resource is less than the preset time resource threshold, it indicates that an existing time resource of the mobile terminal cannot meet a transmission delay requirement of the first wearable device, that is, after the first wearable device is connected to the mobile terminal, a transmission delay of the first wearable device is increased because the time resource allocated by the mobile terminal to the first wearable device is insufficient.

(3) If a disconnection request message, sent by the user, for breaking the connection to the first wearable device is received, determine that the connection relationship with the first wearable device needs to be broken.

For example, when the wearable device A shown in FIG. 5 detects, in any one or more of the foregoing cases (1), (2), and (3), that a connection to the wearable device B needs to be broken, the wearable device A sends a disconnection request message to the wearable device B, breaks the connection to the wearable device B, and reports address information and a device identity of the wearable device B to the mobile terminal. Therefore, the mobile terminal initiates a connection request message to the wearable device B according to the device identity and the address information, establishes a connection to the wearable device B (as shown in FIG. 1), and uses a receive or transmit timeslot corresponding to the mobile terminal in a channel index pattern shown in FIG. 3 to receive or transmit the service data in order to balance load and power consumption between the mobile terminal and the second wearable device used as a BLUETOOTH hub in the personal area network.

This embodiment of the present disclosure provides a data transmission method. After receiving a first broadcast message sent by a first wearable device, a second wearable device sends a second broadcast message to the first wearable device, establishes a connection to the first wearable device, and receives, in an allocated receive or transmit timeslot, the service data sent by the first wearable device. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between the first wearable device and the second wearable device, the first wearable device establishes a connection to the second wearable device directly, and transmits the data to the second wearable device without using the mobile terminal for forwarding, and network overheads are reduced greatly.

Embodiment 3

Figure 8:
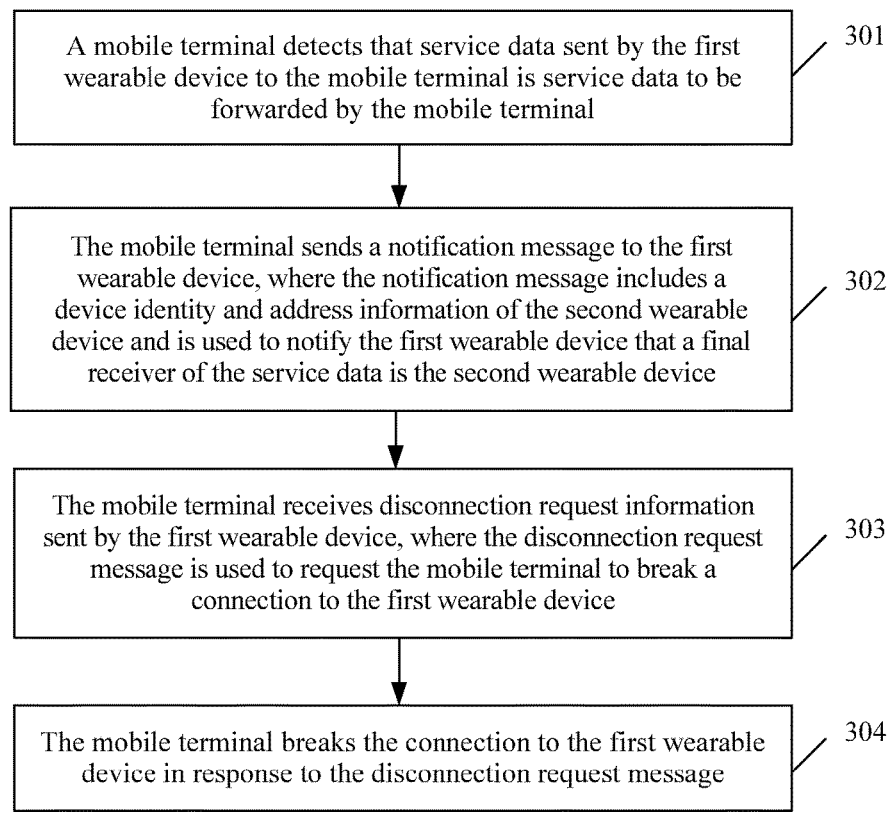
FIG. 8 is a flowchart of another data transmission method according to an embodiment of the present disclosure.

FIG. 8 is another data transmission method provided by this embodiment of the present disclosure. The method is applied to a case of reducing network overheads when a mobile terminal detects that a first wearable device has service data to be forwarded by the mobile terminal to a second wearable device. As shown in FIG. 8, the method may include the following steps.

Step 301: A mobile terminal detects that service data sent by the first wearable device to the mobile terminal is service data to be forwarded by the mobile terminal.

Step 302: The mobile terminal sends a notification message to the first wearable device, where the notification message includes a device identity and address information of the second wearable device and is used to notify the first wearable device that a final receiver of the service data is the second wearable device.

It should be noted that, the final receiver in this embodiment of the present disclosure may refer to a device that does not forward service data to another device after receiving the service data. For example, after the mobile terminal receives service data, if the service data is not forwarded to another device, the mobile terminal is a final receiver of the service data, and if the service data is forwarded to the second wearable device, but the second wearable device does not forward the service data to another device, the second wearable device is a final receiver of the service data.

Step 303: The mobile terminal receives disconnection request information sent by the first wearable device, where the disconnection request message is used to request the mobile terminal to break a connection to the first wearable device.

Step 304: The mobile terminal breaks the connection to the first wearable device in response to the disconnection request message.

Optionally, in this embodiment of the present disclosure, steps 303 and 304 may be directly performed if the service data transmitted by the first wearable device cannot meet a quality of service requirement because receive or transmit timeslots allocated to the first wearable device are reduced due to an increase of wearable devices connected to the mobile terminal.

In this way, after the foregoing process, the first wearable device breaks the connection to the mobile terminal, and further establishes a connection to the second wearable device. For example, the wearable device B adjusts a connection status as shown in FIG. 1 to a connection status as shown in FIG. 5.

Because the second wearable device used as a BLUETOOTH hub is limited by a device size, a battery capacity of the second wearable device is far less than a battery capacity of the mobile terminal used as a master device, and especially after the second wearable device used as a master device is connected to the first wearable device, power consumption of the second wearable device is relatively fast, and this affects use of the second wearable device. In addition, although the second wearable device having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, in this embodiment of the present disclosure, a service of the first wearable device connected to the second wearable device needs to be migrated to the mobile terminal when appropriate. For example, when a quantity of wearable devices connected to the mobile terminal is not large and available timeslot resources are relatively sufficient, the first wearable device may consider breaking the connection to the second wearable device and establish a connection to the mobile terminal, and then a daisy chain network topology is changed to a star network topology. Specific implementation is as follows.

The mobile terminal receives address information and a device identity of the first wearable device that are reported by the second wearable device. The mobile terminal initiates a connection request message to the first wearable device according to the device identity and the address information, where the connection request message is used to request to establish a connection to the first wearable device, and the mobile terminal reestablishes a connection to the first wearable device.

For example, the wearable device B in FIG. 5 breaks a connection to the wearable device A due to reasons such as insufficient power of the wearable device A, and reestablishes a connection to the mobile terminal (as shown in FIG. 1).

As can be known from above, this embodiment of the present disclosure provides a data transmission method. A mobile terminal receives disconnection request information sent by a first wearable device, and breaks a connection to the first wearable device such that the first wearable device establishes a connection to another wearable device.

In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between the first wearable device and a second wearable device, the first wearable device establishes a connection to the second wearable device directly, and transmits the data to the second wearable device without using the mobile terminal for forwarding, and network overheads are reduced greatly.

The following describes in detail an adjustment of a connection relationship of the wearable device B in FIG. 1 to a connection relationship shown in FIG. 5 using specific Embodiment 4 and Embodiment 5, and describes in detail an adjustment of a connection relationship of the wearable device B in FIG. 5 to a connection relationship of the wearable device B shown in FIG. 1 using specific Embodiment 6.

Embodiment 4

Figure 9:
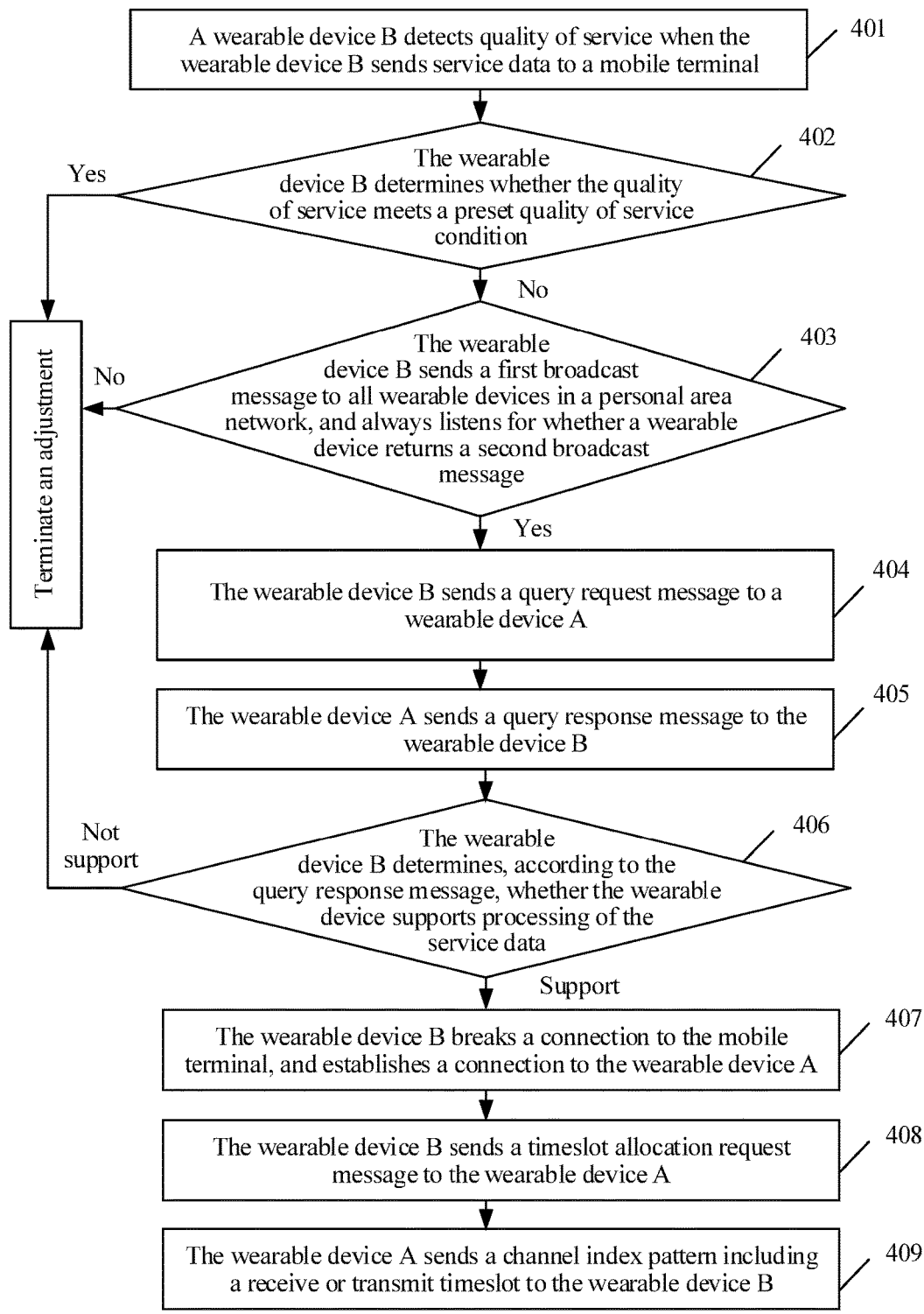
FIG. 9 is a flowchart of another data transmission method according to an embodiment of the present disclosure.

This embodiment mainly describes a process of converting the wearable device A having high intelligence in wearable devices from a slave device into a BLUETOOTH hub, connecting the wearable device B having low intelligence in the network to a wearable device having high intelligence, and adjusting a topology of the personal area network from a star network topology to a daisy chain network as shown in FIG. 5 if a data transmission rate is reduced and a transmission delay is increased and cannot meet requirements of the wearable device B on the transmission rate and transmission delay for transmitting service data, because a quantity of wearable devices connected to the mobile terminal in the personal area network shown in FIG. 1 is large and timeslots allocated by the mobile terminal to each wearable device for receiving or transmitting BLUETOOTH signals are reduced. As shown in FIG. 9, the process may include the following steps.

Step 401: The wearable device B detects quality of service when the wearable device B sends service data to the mobile terminal.

The quality of service may include a transmission rate and a transmission delay.

Preferably, the wearable device B may detect in real time, after establishing a BLUETOOTH connection to the mobile terminal, the quality of service when the wearable device B sends the service data to the mobile terminal.

Step 402: The wearable device B determines whether the quality of service meets a preset quality of service condition.

If the quality of service meets the preset quality of service condition, the wearable device B does not adjust a connection relationship between the wearable device B and the mobile terminal, and an adjustment of the personal area network is terminated. If the quality of service does not meet the preset quality of service condition, the wearable device B performs step 403.

The preset quality of service condition includes a preset transmission rate threshold and a preset transmission delay threshold, and that the quality of service does not meet a preset quality of service condition may include that the transmission delay is greater than the preset transmission delay threshold, the transmission rate is lower than the preset transmission rate threshold, or the transmission delay is greater than the preset transmission delay threshold, and the transmission rate is lower than the preset transmission rate threshold.

It should be noted that, the preset transmission delay threshold and the preset transmission rate threshold are set according to a requirement of the transmitted service data, and are not limited in this embodiment of the present disclosure.

Step 403: The wearable device B sends a first broadcast message to all wearable devices in the personal area network, and always listens for whether a wearable device returns a second broadcast message.

If no wearable device returns a second broadcast message, it indicates that there is no device having a BLUETOOTH hub function in the personal area network, the wearable device B does not adjust the connection relationship between the wearable device B and the mobile terminal, and the adjustment of the personal area network is terminated. If the wearable device B obtains by listening, a second broadcast message sent by the wearable device A, the wearable device B determines that the wearable device A is a device having a BLUETOOTH hub function, and performs step 404.

The first broadcast message is used to indicate that the first wearable device may establish a connection to another wearable device.

Step 404: The wearable device B sends a query request message to the wearable device A.

The query request message is used to query service data supported by the second wearable device.

Step 405: The wearable device A sends a query response message to the wearable device B.

The query response message includes the service data supported by the second wearable device.

Step 406: The wearable device B determines, according to the query response message, whether the wearable device supports processing of the service data.

If the wearable device B supports processing of the service data, the wearable device B performs step 407.

If the wearable device does not support processing of the service data, the wearable device B does not adjust the connection relationship between the wearable device B and the mobile terminal, and the adjustment of the personal area network is terminated.

Step 407: The wearable device B breaks a connection to the mobile terminal, and establishes a connection to the wearable device A.

The wearable device B establishes a BLE connection to the wearable device A by performing three existing processes of discovery, pairing, and connection establishment. Details are not described herein.

Step 408: The wearable device B sends a timeslot allocation request message to the wearable device A.

The timeslot allocation request message is used to request the wearable device A to allocate a corresponding receive or transmit timeslot to the wearable device B.

Step 409: The wearable device A sends a channel index pattern including a receive or transmit timeslot to the wearable device B.

The receive or transmit timeslot is a receive or transmit timeslot corresponding to the wearable device B, and is different from a receive or transmit timeslot allocated by the mobile terminal.

Optionally, the wearable device B may require that a quantity of receive or transmit timeslots allocated by the wearable device A should be greater than a quantity of receive or transmit timeslots allocated by the mobile terminal to the wearable device B in order to meet a quality of service requirement. For example, as can be known from comparison between FIG. 3 and FIG. 6, receive or transmit timeslots allocated by the wearable device A to the wearable device B are more than receive or transmit timeslots allocated by the mobile terminal to the wearable device B, and frequency resources occupied by the wearable device B for sending data to the wearable device A are the same as frequency resources occupied by other wearable devices for sending data to the mobile terminal, that is, for different master devices, data is transmitted in frequency division multiplexing mode between wearable devices connected to the master devices. In this way, when quality of service of the transmitted data is met, utilization of frequency resources is also greatly increased.

As can be known from above, this embodiment of the present disclosure provides a data transmission method. When service data transmitted by a wearable device B cannot meet a preset service condition, the wearable device B breaks a connection to a mobile terminal, establishes a connection to a wearable device A, and transmits data in frequency division multiplexing mode in a receive or transmit timeslot allocated by the wearable device A in order to transmit data in sufficient receive or transmit timeslots allocated by the wearable device A. In this way, a quality of service requirement of the data transmitted by the wearable device B may be met, and spectrum utilization may also be improved.

Embodiment 5

Figure 10:
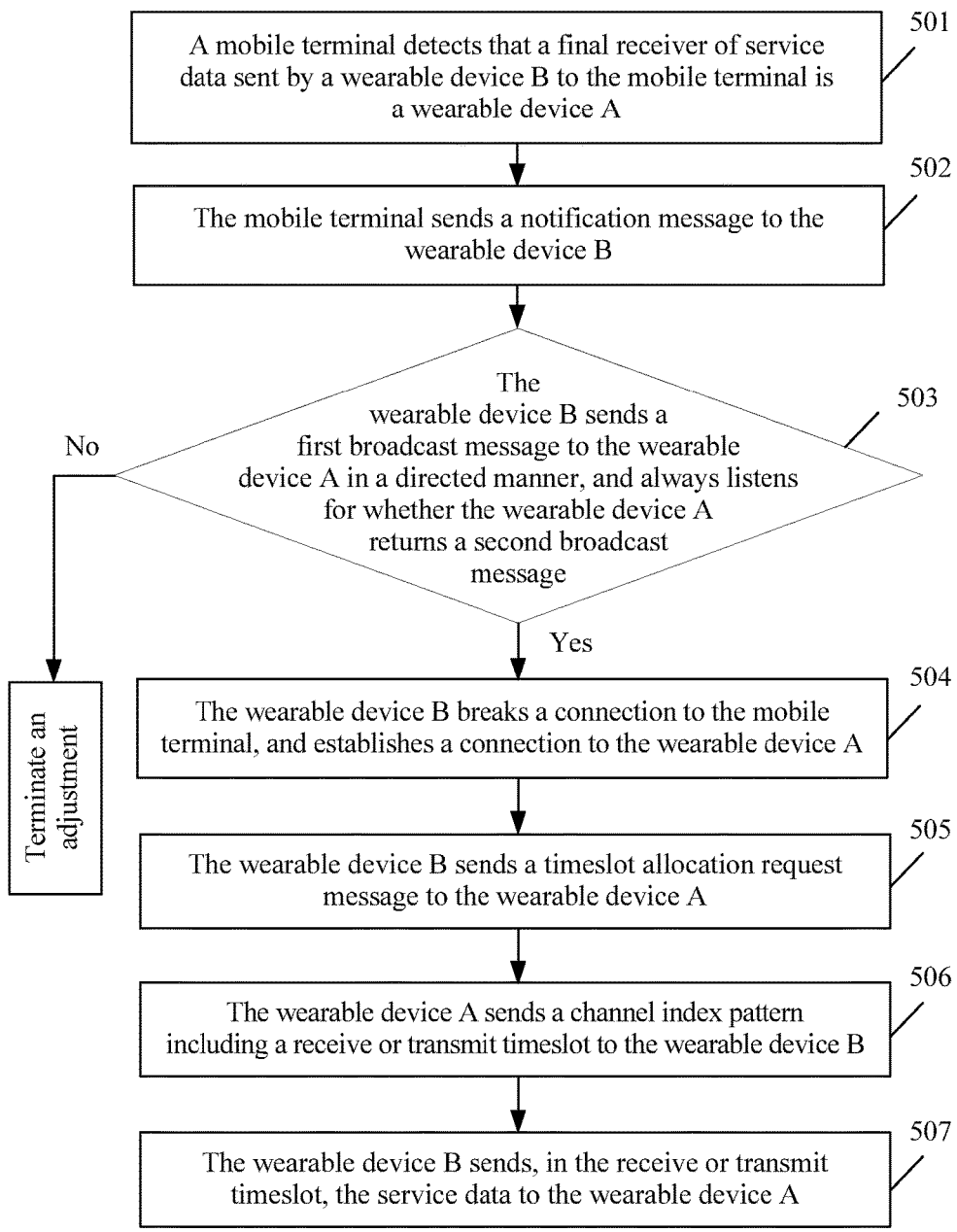
FIG. 10 is a flowchart of another data transmission method according to an embodiment of the present disclosure.

This embodiment mainly describes a process of adjusting a topology of the personal area network from a star network topology to a daisy chain network as shown in FIG. 5 if network overheads are increased because a wearable device must send data to the mobile terminal and the mobile terminal forwards the data to another wearable device when interaction between wearable devices in the personal area network shown in FIG. 1 better meets a user requirement. As shown in FIG. 10, the process may include the following steps.

Step 501: The mobile terminal detects that a final receiver of service data sent by the wearable device B to the mobile terminal is the wearable device A.

Step 502: The mobile terminal sends a notification message to the wearable device B.

The notification message includes a device identity and address information of the second wearable device and is used to notify the first wearable device that the final receiver of the service data is the second wearable device.

Step 503: The wearable device B sends a first broadcast message to the wearable device A in a directed manner, and always listens for whether the wearable device A returns a second broadcast message.

If the wearable device A does not return the second broadcast message, it indicates that the wearable device A does not have a BLUETOOTH hub function, the wearable device B does not adjust a connection relationship between the wearable device B and the mobile terminal, and an adjustment of the personal area network is terminated.

If the wearable device B obtains by listening, the second broadcast message sent by the wearable device A, the wearable device B determines that the wearable device A is a device having a BLUETOOTH hub function, and performs step 504.

Step 504: The wearable device B breaks a connection to the mobile terminal, and establishes a connection to the wearable device A.

The wearable device B establishes a BLE connection to the wearable device A by performing three existing processes of discovery, pairing, and connection establishment. Details are not described herein.

Step 505: The wearable device B sends a timeslot allocation request message to the wearable device A.

The timeslot allocation request message is used to request the wearable device A to allocate a corresponding receive or transmit timeslot to the wearable device B.

Step 506: The wearable device A sends a channel index pattern including a receive or transmit timeslot to the wearable device B.

The receive or transmit timeslot is a receive or transmit timeslot corresponding to the wearable device B, and is different from a receive or transmit timeslot allocated by the mobile terminal.

Step 507: The wearable device B sends, in the receive or transmit timeslot, the service data to the wearable device A.

As can be known from above, this embodiment of the present disclosure provides a data transmission method. When a mobile terminal detects that data sent by a wearable device B is data to be forwarded by the mobile terminal to a wearable device A, the mobile terminal sends a notification message to the wearable device B such that the wearable device B breaks a connection to the mobile terminal and directly establishes a connection to the wearable device A. In this way, transmitted service data does not need to be forwarded by the mobile terminal, but is directly sent to a receiver. This greatly reduces network overheads.

Embodiment 6

This embodiment mainly describes a process in which the wearable device A breaks a connection to the wearable device B to adjust a network topology from a daisy chain network to a star network shown in FIG. 1 if use of the device is affected or a size of a screen and a display resolution of the screen of the device cannot meet a user requirement because power consumption of the wearable device A having a BLUETOOTH hub function and playing roles of both a master device and a slave device is too fast in the personal area network shown in FIG. 5.

Figure 11:
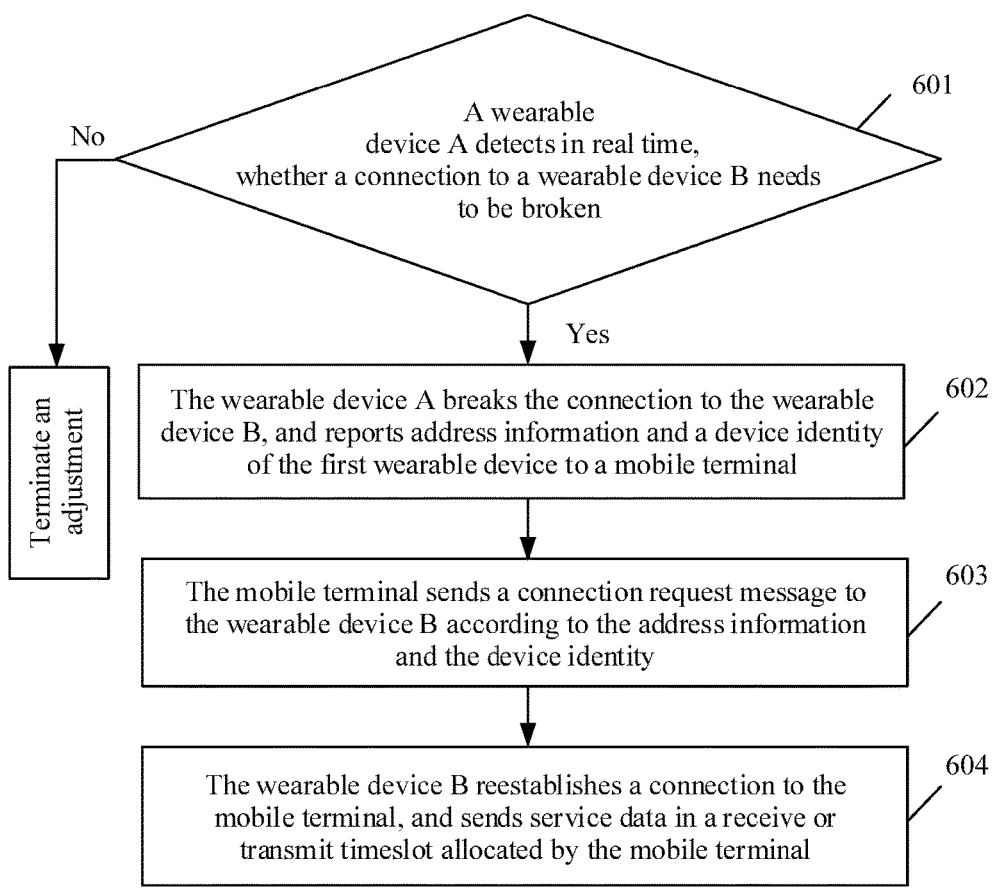
FIG. 11 is a flowchart of another data transmission method according to an embodiment of the present disclosure.

As shown in FIG. 11, the process may include the following steps.

Step 601: The wearable device A detects in real time, whether a connection to the wearable device B needs to be broken. If determining that the connection to the wearable device B needs to be broken, performs step 602, or if unnecessary, terminates an adjustment.

For example, the wearable device A may determine, in any one or more of the following manners (1), (2), and (3), whether the connection to the first wearable device needs to be broken.

(1) Detect remaining power of the second wearable device, and if the remaining power is less than a preset remaining power threshold, determine that the connection to the first wearable device needs to be broken.

The preset remaining power threshold may be set according to a requirement, and is not limited in this embodiment of the present disclosure. If the remaining power is less than the preset remaining power threshold, it indicates that power of the second wearable device is consumed excessively, and possibly cannot support subsequent service data reception or transmission by the first wearable device. If the remaining power is greater than the preset remaining power threshold, it indicates that power of the second wearable device is relatively sufficient, and may meet a power requirement of the first wearable device for receiving or transmitting service data.

(2) Detect a remaining time resource after the mobile terminal allocates a time resource to each wearable device connected to the mobile terminal, and if the remaining time resource is greater than or equal to a preset time resource threshold, determine that the connection to the first wearable device needs to be broken.

The preset time resource threshold may be set according to a requirement, and is not limited in this embodiment of the present disclosure. If the remaining time resource is greater than or equal to the preset time resource threshold, it indicates that an existing time resource of the mobile terminal may meet a transmission delay requirement of the first wearable device, that is, when the first wearable device is connected to the mobile terminal and receives or transmits the service data, a transmission delay is not increased. If the remaining time resource is less than the preset time resource threshold, it indicates that an existing time resource of the mobile terminal cannot meet a transmission delay requirement of the first wearable device, that is, after the first wearable device is connected to the mobile terminal, a transmission delay of the first wearable device is increased because the time resource allocated by the mobile terminal to the first wearable device is insufficient.

(3) If a disconnection request message, sent by a user, for breaking the connection to the first wearable device is received, determine that the connection relationship with the first wearable device needs to be broken.

Step 602: The wearable device A breaks the connection to the wearable device B, and reports address information and a device identity of the first wearable device to the mobile terminal.

The address information and the device identity are used to uniquely identify a location of the wearable device B in the personal area network.

Step 603: The mobile terminal sends a connection request message to the wearable device B according to the address information and the device identity.

The connection request message is used to request the first wearable device to establish a connection to the mobile terminal.

Step 604: The wearable device B reestablishes a connection to the mobile terminal, and sends service data in a receive or transmit timeslot allocated by the mobile terminal.

As can be known from above, this embodiment of the present disclosure provides a data transmission method. When a wearable device A acting as both a master device and a slave device detects that a connection to a wearable device B needs to be broken, the wearable device A breaks the connection to the wearable device B, and notifies a mobile terminal to establish a connection to the wearable device B. In this way, when a wearable device having a BLUETOOTH hub function cannot support data transmission, a wearable device connected to the wearable device is disconnected appropriately, and a daisy chain topology of a personal area network is restored to a star topology.

Embodiment 7

Figure 12A:
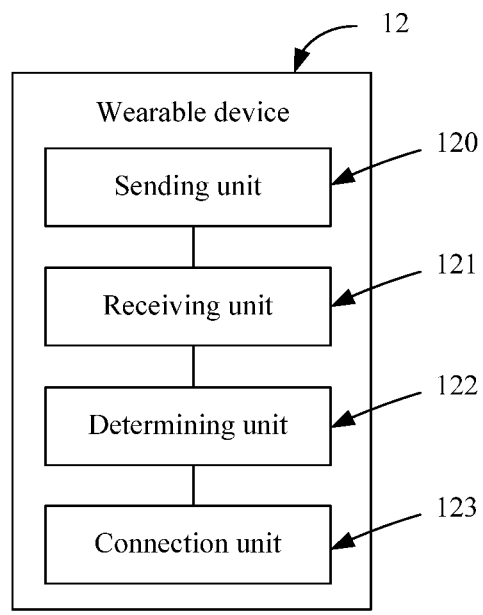
FIG. 12A is a structural diagram of a wearable device according to an embodiment of the present disclosure.

FIG. 12A shows a structural diagram of a wearable device 12 provided by this embodiment of the present disclosure. The wearable device 12 may be any wearable device connected to a master device (such as a mobile terminal) in a personal area network, and is configured to perform the method in Embodiment 1.

As shown in FIG. 12A, the wearable device 12 may include a sending unit 120, a receiving unit 121, a determining unit 122, and a connection unit 123.

The sending unit 120 is configured to send a first broadcast message to a second wearable device.

The first broadcast message is used to indicate that the wearable device 12 may establish a connection to another wearable device, and may be sent by global broadcast to all wearable devices including the second wearable device in the personal area network, or may be sent by directed broadcast to only the second wearable device. For example, assuming that the wearable device B in FIG. 1 is the wearable device 12, and that the wearable device A is the second wearable device, the wearable device B may send the first broadcast message to the wearable device A, the wearable device C, the wearable device D, and the wearable device in the personal area network, or may send the first broadcast message to the wearable device A in a directed manner.

The receiving unit 121 is configured to obtain by listening, a second broadcast message sent by the second wearable device to the wearable device 12.

The second broadcast message is used to indicate that the second wearable device has a BLUETOOTH hub function and may establish a connection to the wearable device 12.

The determining unit 122 is configured to determine, after the receiving unit 121 obtains the second broadcast message by listening, whether the second wearable device supports processing of service data of the wearable device 12.

The connection unit 123 is configured to establish a connection to the second wearable device.

The sending unit 120 is further configured to send the service data in an allocated receive or transmit timeslot to the second wearable device after the connection unit 123 establishes the connection to the second wearable device.

The receive or transmit timeslot is different from a receive or transmit timeslot allocated by the mobile terminal, and may be allocated by the second wearable device, or may be allocated by the wearable device 12.

Optionally, when receive or transmit timeslots allocated to the wearable device 12 are reduced because a quantity of wearable devices connected to the mobile terminal increases, and consequentially, the service data transmitted by the wearable device 12 cannot meet a quality of service requirement (for example, a low delay), the wearable device 12 may require that a quantity of receive or transmit timeslots allocated by the second wearable device should be greater than a quantity of receive or transmit timeslots allocated by the mobile terminal to the wearable device 12 in order to meet the quality of service requirement. For example, as can be known from comparison between FIG. 3 and FIG. 6, receive or transmit timeslots allocated by the wearable device A to the wearable device B are more than receive or transmit timeslots allocated by the mobile terminal to the wearable device B, and frequency resources occupied by the wearable device B for sending data to the wearable device A are the same as frequency resources occupied by other wearable devices for sending data to the mobile terminal, that is, for different master devices, data is transmitted in frequency division multiplexing mode between wearable devices connected to the master devices. In this way, when quality of service of the transmitted data is met, utilization of frequency resources is also greatly increased.

It should be noted that, when the connection unit 123 establishes the connection to the second wearable device, the connection unit 123 may maintain a connection relationship with the mobile terminal, but the connection unit 123 and the mobile terminal do not transmit data to each other, or the connection unit 123 may break a connection relationship with the mobile terminal completely. For example, in the personal area network shown in FIG. 1, after the wearable device B (the wearable device 12) determines that the wearable device A (the second wearable device) supports processing of service data of the wearable device B, the wearable device B breaks a connection to the mobile terminal, connects to the wearable device A (as shown in FIG. 5), and sends, to the wearable device A, the service data in a receive or transmit timeslot (as shown in FIG. 6) allocated by the wearable device A.

Although the wearable device 12 has determined that the second wearable device is a device having the BLUETOOTH hub function and may establish a connection to the wearable device, to ensure that the service data of the wearable device, after being sent to the second wearable device, can be processed by the second wearable device, in this embodiment, the wearable device 12 further needs to determine whether the second wearable device supports processing of the service data of the wearable device 12.

Optionally, the sending unit 120 is further configured to send a query request message to the second wearable device, where the query request message is used to query service data supported by the second wearable device. The receiving unit 121 is further configured to receive a query response message returned by the second wearable device, where the query response message includes the service data supported by the second wearable device, and the determining unit 122 is further configured to determine that the second wearable device supports processing of the service data if the service data supported by the second wearable device includes the service data of the wearable device 12, or determine that the second wearable device does not support processing of the service data if the service data supported by the second wearable device does not include the service data of the wearable device 12, that is, the second wearable device cannot parse the service data, and even if a transmission delay of the service data increases, the connection unit 123 cannot establish a connection to the second wearable device.

Service data of a wearable device is generated by a service supported by the wearable device. Each service supported by the wearable device corresponds to a specific piece of service data. For example, if sports shoes may support services such as heart rate measurement, and running speed and cadence measurement, service data that may be generated by the sports shoes may include heart rate measurement service data, and RSCS data. Each service includes at least one feature, and service data corresponding to the feature has a defined specific data structure, and includes elements such as a feature name, a feature value, a feature value unit, and a data type. In this embodiment, the service data of the wearable device 12 may be service data that is already sent to the mobile terminal but is not sent successfully, or may be service data that does not meet some quality conditions or the like during sending and will be sent to the mobile terminal.

For example, service data being transmitted between a wearable device that is sports shoes and the mobile terminal is RSCS data, service data being transmitted between a wearable device that is an anti-loss tag and the mobile terminal is IAS data. In this case, if types of service data supported by the second wearable device include RSCS, IAS, and temperature and humidity services, the sports shoes and the anti-loss tag respectively determine, after receiving a query response message sent by the second wearable device, that the second wearable device supports processing of the RSCS and the IAS, if types of service data supported by the second wearable device include IAS and temperature and humidity services, after the sports shoes and the anti-loss tag respectively receive a query response message sent by the second wearable device, the sports shoes determine that the second wearable device does not support processing of the service data transmitted between the sports shoes and the mobile terminal, but the anti-loss tag determines that the second wearable device does not support processing of the service data transmitted between the sports shoes and the mobile terminal, and therefore terminates establishment of a connection to the second wearable device.

Optionally, the connection unit 123 is further configured to establish a BLE connection to the second wearable device by performing three existing processes of discovery, pairing, and connection establishment. Details are not described herein.

For example, in the personal area network shown in FIG. 1, after the wearable device B (the wearable device 12) determines that the wearable device A (the second wearable device) supports processing of service data of the wearable device B, the wearable device B breaks a connection to the mobile terminal, connects to the wearable device A (as shown in FIG. 5), and sends, to the wearable device A, the service data in a receive or transmit timeslot (as shown in FIG. 6) allocated by the wearable device A.

Figure 12B:
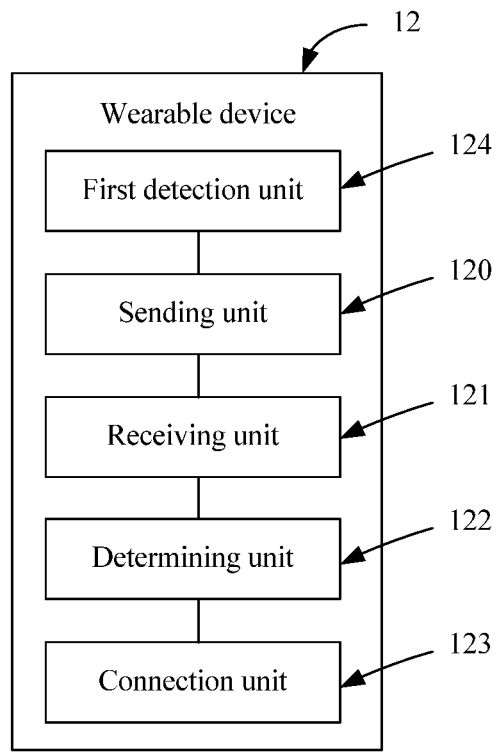
FIG. 12B is a structural diagram of a wearable device according to an embodiment of the present disclosure.

Optionally, in this embodiment of the present disclosure, if the service data transmitted by the wearable device 12 cannot meet the quality of service requirement because the receive or transmit timeslots allocated to the wearable device 12 are reduced due to the increase of wearable devices connected to the mobile terminal, to meet the quality of service requirement of the service data transmitted by the wearable device 12, as shown in FIG. 12B, the wearable device 12 may further include a first detection unit 124 configured to detect, before the sending unit 120 sends the first broadcast message to the second wearable device, quality of service when the first wearable device (i.e., the wearable device 12) sends the service data to the mobile terminal, and the determining unit 122 is further configured to determine that the quality of service does not meet a preset quality of service condition.

The quality of service includes a transmission delay and a transmission rate, the preset quality of service condition includes a preset transmission rate threshold and a preset transmission delay threshold, and that the quality of service does not meet a preset quality of service condition may include that the transmission delay is greater than the preset transmission delay threshold, the transmission rate is lower than the preset transmission rate threshold, or the transmission delay is greater than the preset transmission delay threshold, and the transmission rate is lower than the preset transmission rate threshold.

It should be noted that, the preset transmission delay threshold and the preset transmission rate threshold are set according to a requirement of the transmitted service data, and are not limited in this embodiment of the present disclosure.

Correspondingly, the first broadcast message sent by the sending unit 120 may be a global broadcast message, and sent to each wearable device in the personal area network.

In addition, in this embodiment of the present disclosure, to implement direct communication between wearable devices when there is service data of direct communication between the wearable device 12 and the second wearable device in order to reduce network overheads, the receiving unit 121 is further configured to receive, before the sending unit 120 sends the first broadcast message to the second wearable device, a notification message sent by the mobile terminal, where the notification message includes a device identity and address information of the second wearable device and is used to notify the wearable device 12 that a final receiver of the service data is the second wearable device.

Figure 12C:
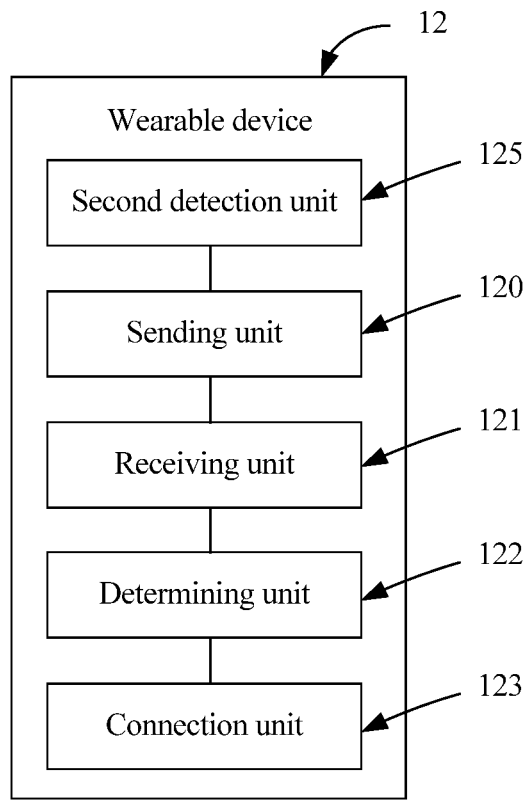
FIG. 12C is a structural diagram of a wearable device according to an embodiment of the present disclosure.

Alternatively, as shown in FIG. 12C, the wearable device 12 may further include a second detection unit 125 configured to detect that a final receiver of the service data is the second wearable device.

Correspondingly, the first broadcast message sent by the sending unit 120 is a directed broadcast message sent to only the second wearable device.

Because the second wearable device used as a BLUETOOTH hub is limited by a device size, a battery capacity of the second wearable device is far less than a battery capacity of the mobile terminal used as a master device, and especially after the second wearable device used as a master device is connected to the wearable device 12, power consumption of the second wearable device is relatively fast, and this affects use of the second wearable device. In addition, although the second wearable device having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, a service of the wearable device 12 connected to the second wearable device needs to be migrated to the mobile terminal when appropriate. For example, when a quantity of wearable devices connected to the mobile terminal is not large and available timeslot resources are relatively sufficient, the wearable device 12 may consider breaking the connection to the second wearable device and establish a connection to the mobile terminal, and then a daisy chain network topology is changed to a star network topology. Specific implementation is as follows.

The receiving unit 121 is further configured to receive a disconnection request message sent by the second wearable device, where the disconnection request message is used to request the wearable device 12 to break the connection to the second wearable device. The connection unit 123 is further configured to break the connection to the second wearable device in response to the disconnection request message. The receiving unit 121 is further configured to receive a connection request message sent by the mobile terminal, where the connection request message is used to request the wearable device 12 to establish a connection to the mobile terminal. The connection unit 123 is further configured to establish the connection to the mobile terminal after the receiving unit 121 receives the connection request message, and the sending unit 120 is further configured to receive or transmit the service data in an allocated receive or transmit timeslot.

Herein the receive or transmit timeslot may be allocated by the mobile terminal or may be allocated by the wearable device 12.

For example, the wearable device B and the wearable device C connected to the wearable device A as shown in FIG. 5 respectively break a connection to the wearable device A, and still connect to the mobile terminal (as shown in FIG. 1), and the wearable device B or the wearable device C receives or transmits service data using a corresponding receive or transmit timeslot in a channel index pattern shown in FIG. 3.

As can be known from above, this embodiment of the present disclosure provides the wearable device 12. After the wearable device 12 obtains by listening, a second broadcast message sent by a second wearable device and determines that the second wearable device supports processing of service data of the wearable device 12, the wearable device 12 breaks a connection to a mobile terminal, establishes a connection to the second wearable device, and sends data in an allocated receive or transmit timeslot to the second wearable device. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between a first wearable device and the second wearable device, the first wearable device establishes a connection to the second wearable device directly, and transmits the data to the second wearable device without using the mobile terminal for forwarding, and network overheads are reduced greatly.

Embodiment 8

Figure 13A:
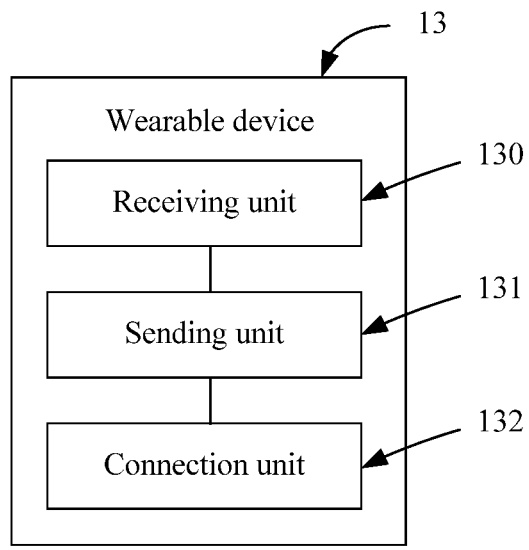
FIG. 13A is a structural diagram of a wearable device according to an embodiment of the present disclosure.

FIG. 13A shows a structural diagram of a wearable device 13 provided by this embodiment of the present disclosure. The wearable device 13 is configured to perform the method in Embodiment 2.

As shown in FIG. 13A, the wearable device 13 may include a receiving unit 130, a sending unit 131, and a connection unit 132.

The receiving unit 130 is configured to receive a first broadcast message sent by a first wearable device.

The first broadcast message is used to indicate that the first wearable device may establish a connection to another wearable device, and may be sent by global broadcast to all wearable devices including the wearable device 13 in a personal area network, or may be sent by directed broadcast to only the wearable device 13.

The sending unit 131 is configured to send a second broadcast message to the first wearable device.

The second broadcast message is used to indicate that the wearable device 13 has a BLUETOOTH hub function and may connect to the first wearable device.

The connection unit 132 is configured to establish a connection to the first wearable device.

The receiving unit 130 is further configured to receive, in an allocated receive or transmit timeslot, the service data sent by the first wearable device after the connection unit 132 establishes the connection to the first wearable device.

The receive or transmit timeslot is different from a receive or transmit timeslot allocated by the mobile terminal, and may be allocated by the wearable device 13, or may be allocated by the first wearable device.

Optionally, when receive or transmit timeslots allocated to the first wearable device are reduced because a quantity of wearable devices connected to the mobile terminal increases, and consequentially, the service data transmitted by the first wearable device cannot meet a quality of service requirement (for example, a low delay), the first wearable device may require that a quantity of receive or transmit timeslots allocated by the wearable device 13 should be greater than a quantity of receive or transmit timeslots allocated by the mobile terminal to the first wearable device in order to meet the quality of service requirement. For example, as can be known from comparison between FIG. 3 and FIG. 6, receive or transmit timeslots allocated by the wearable device A to the wearable device B are more than receive or transmit timeslots allocated by the mobile terminal to the wearable device B, and frequency resources occupied by the wearable device B for sending data to the wearable device A are the same as frequency resources occupied by other wearable devices for sending data to the mobile terminal, that is, for different master devices, data is transmitted in frequency division multiplexing mode between wearable devices connected to the master devices. In this way, when quality of service of the transmitted data is met, utilization of frequency resources is also greatly increased.

Optionally, the connection unit 132 is further configured to establish a BLE connection to the first wearable device by performing three existing processes of discovery, pairing, and connection establishment. Details are not described herein.

Optionally, to ensure that the service data transmitted between the first wearable device and the mobile terminal can be still parsed and forwarded by the wearable device 13 after the first wearable device is connected to the wearable device 13, the receiving unit 130 is further configured to receive a query request message sent by the first wearable device, where the query request message is used to query service data supported by the wearable device 13, and the sending unit 131 is further configured to send a query response message to the first wearable device, where the query response message includes the service data supported by the wearable device 13 such that the first wearable device determines, according to the service data supported by the wearable device 13, that the wearable device 13 supports processing of the service data.

Figure 13B:
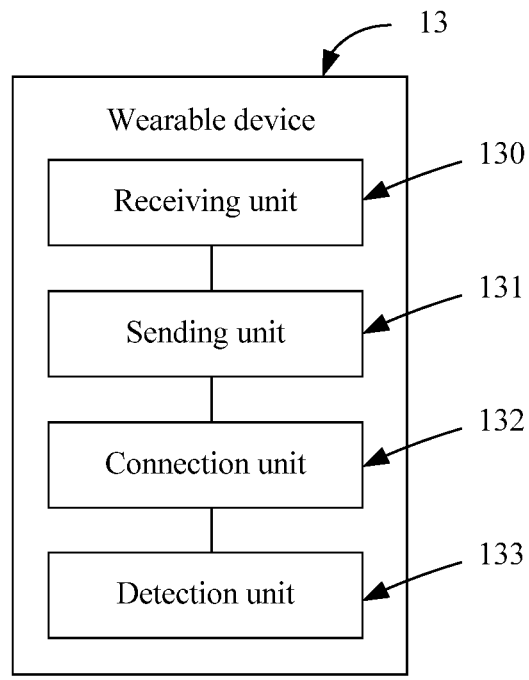
FIG. 13B is a structural diagram of a wearable device according to an embodiment of the present disclosure.

Because the wearable device 13 used as a BLUETOOTH hub is limited by a device size, a battery capacity of the wearable device 13 is far less than a battery capacity of the mobile terminal used as a master device, and after the wearable device 13 used as a master device is connected to the first wearable device, power consumption of the wearable device 13 is relatively fast, and this affects use of the wearable device 13. In addition, although the wearable device 13 having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, a service of the first wearable device connected to the wearable device 13 in the personal area network needs to be migrated. For example, when the quantity of wearable devices connected to the mobile terminal is not large and available timeslot resources are relatively sufficient, the first wearable device needs to further break the connection to the wearable device 13 and establish a connection to the mobile terminal, and then a daisy chain network topology is changed to a star network topology. Further, as shown in FIG. 13B, the wearable device 13 may further include a detection unit 133 configured to detect in real time, whether the connection to the first wearable device needs to be broken. The connection unit 132 is further configured to break the connection to the first wearable device if the detection unit 133 detects that the wearable device 13 needs to break the connection to the first wearable device, and the sending unit 131 is further configured to report address information and a device identity of the first wearable device to the mobile terminal such that the mobile terminal initiates a connection request message to the first wearable device according to the device identity and the address information, where the disconnection request message is used to request the first wearable device to break the connection to the wearable device 13, and the connection request message is used to request the first wearable device to establish a connection to the mobile terminal.

For example, the detection unit 133 may further determine, in any one or more of the following manners (1), (2), and (3), whether the connection to the first wearable device needs to be broken.

(1) Detect remaining power of the wearable device 13, and if the remaining power is less than a preset remaining power threshold, determine that the connection to the first wearable device needs to be broken.

The preset remaining power threshold may be set according to a requirement, and is not limited in this embodiment of the present disclosure. If the remaining power is less than the preset remaining power threshold, it indicates that power of the wearable device 13 is consumed excessively, and possibly cannot support subsequent service data reception or transmission by the first wearable device. If the remaining power is greater than the preset remaining power threshold, it indicates that power of the wearable device 13 is relatively sufficient, and may meet a power requirement of the first wearable device for receiving or transmitting the service data.

(2) Detect a remaining time resource after the mobile terminal allocates a time resource to each wearable device connected to the mobile terminal, and if the remaining time resource is greater than or equal to a preset time resource threshold, determine that the connection to the first wearable device needs to be broken.

The preset time resource threshold may be set according to a requirement, and is not limited in this embodiment of the present disclosure. If the remaining time resource is greater than or equal to the preset time resource threshold, it indicates that an existing time resource of the mobile terminal may meet a transmission delay requirement of the first wearable device, that is, when the first wearable device is connected to the mobile terminal and receives or transmits the service data, a transmission delay is not increased. If the remaining time resource is less than the preset time resource threshold, it indicates that an existing time resource of the mobile terminal cannot meet a transmission delay requirement of the first wearable device, that is, after the first wearable device is connected to the mobile terminal, a transmission delay of the first wearable device is increased because the time resource allocated by the mobile terminal to the first wearable device is insufficient.

(3) If a disconnection request message, sent by the user, for breaking the connection to the first wearable device is received, determine that the connection relationship with the first wearable device needs to be broken.

For example, when the wearable device A shown in FIG. 5 detects, in any one or more of the foregoing cases (1), (2), and (3), that a connection to the wearable device B needs to be broken, the wearable device A sends a disconnection request message to the wearable device B, breaks the connection to the wearable device B, and reports address information and a device identity of the wearable device B to the mobile terminal. Therefore, the mobile terminal initiates a connection request message to the wearable device B according to the device identity and the address information, establishes a connection to the wearable device B (as shown in FIG. 1), and uses a receive or transmit timeslot corresponding to the mobile terminal in a channel index pattern shown in FIG. 3 to receive or transmit the service data in order to balance load and power consumption between the mobile terminal and the wearable device used as a BLUETOOTH hub in the personal area network.

As can be known from above, this embodiment of the present disclosure provides the wearable device 13. After receiving a first broadcast message sent by a first wearable device, the wearable device 13 sends a second broadcast message to the first wearable device, establishes a connection to the first wearable device, and receives, in an allocated receive or transmit timeslot, the service data sent by the first wearable device. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between the first wearable device and a second wearable device, the first wearable device establishes a connection to the second wearable device directly, and transmits the data to the second wearable device without using the mobile terminal for forwarding, and network overheads are reduced greatly.

Embodiment 9

Figure 14:
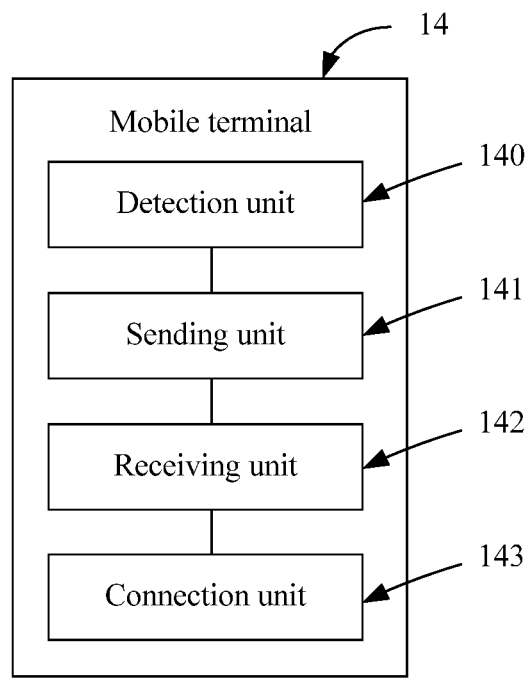
FIG. 14 is a structural diagram of a mobile terminal according to an embodiment of the present disclosure.

FIG. 14 is a structural diagram of a mobile terminal 14 provided by this embodiment of the present disclosure. The mobile terminal 14 is configured to perform the method in Embodiment 3.

As shown in FIG. 14, the mobile terminal 14 may include a detection unit 140 configured to detect that service data sent by the first wearable device to the mobile terminal 14 is service data to be forwarded by the mobile terminal 14, a sending unit 141 configured to send a notification message to the first wearable device when the detection unit 140 detects that the service data is the data to be forwarded, where the notification message includes a device identity and address information of the second wearable device and is used to notify the first wearable device that a final receiver of the service data is the second wearable device, a receiving unit 142 configured to receive disconnection request information sent by the first wearable device, where the disconnection request message is used to request the mobile terminal 14 to break a connection to the first wearable device, and a connection unit 143 configured to break the connection to the first wearable device in response to the disconnection request message received by the receiving unit 142.

Optionally, in this embodiment of the present disclosure, the mobile terminal 14 may also include only the receiving unit 142 and the connection unit 143. If the service data transmitted by the first wearable device cannot meet a quality of service requirement because receive or transmit timeslots allocated to the first wearable device are reduced due to an increase of wearable devices connected to the mobile terminal 14, the receiving unit 142 and the connection unit 143 adjust a topology of a personal area network.

In this way, after the processing by the foregoing units or modules, the first wearable device breaks the connection to the mobile terminal 14, and further establishes a connection to the second wearable device. For example, the wearable device B adjusts a connection status as shown in FIG. 1 to a connection status as shown in FIG. 5.

Because the second wearable device used as a BLUETOOTH hub is limited by a device size, a battery capacity of the second wearable device is far less than a battery capacity of the mobile terminal 14 used as a master device, and after the second wearable device used as a master device is connected to the first wearable device, power consumption of the second wearable device is relatively fast, and this affects use of the second wearable device. In addition, although the second wearable device having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, in this embodiment of the present disclosure, a service of the first wearable device connected to the second wearable device needs to be migrated to the mobile terminal 14 when appropriate. For example, when the quantity of wearable devices connected to the mobile terminal 14 is not large and available timeslot resources are relatively sufficient, the first wearable device may consider breaking the connection to the second wearable device and establish a connection to the mobile terminal 14, and then a daisy chain network topology is changed to a star network topology. Specific implementation is as follows.

The receiving unit 142 receives address information and a device identity of the first wearable device that are reported by the second wearable device. The sending unit 141 is further configured to initiate a connection request message to the first wearable device according to the device identity and the address information, where the connection request message is used to request to establish a connection to the first wearable device, and the connection unit 143 is further configured to reestablish a connection to the first wearable device.

For example, the wearable device B in FIG. 5 breaks a connection to the wearable device A due to reasons such as insufficient power of the wearable device A, and reestablishes a connection to the mobile terminal (as shown in FIG. 1).

As can be known from above, this embodiment of the present disclosure provides the mobile terminal 14. The mobile terminal 14 receives disconnection request information sent by a first wearable device, and breaks a connection to the first wearable device such that the first wearable device establishes a connection to another wearable device. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between the first wearable device and a second wearable device, the first wearable device establishes a connection to the second wearable device directly, and transmits the data to the second wearable device without using the mobile terminal for forwarding, and network overheads are reduced greatly.

Embodiment 10

Figure 15:
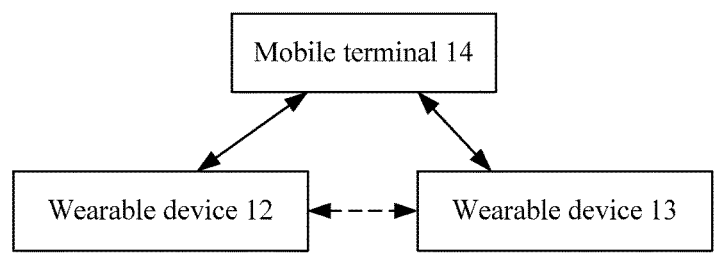
FIG. 15 is a structural diagram of a data transmission system according to an embodiment of the present disclosure.

FIG. 15 shows a structural diagram of a data transmission system provided by this embodiment of the present disclosure. The data transmission system is configured to perform the methods in Embodiment 4, Embodiment 5, and Embodiment 6.

As shown in FIG. 15, the system may include a wearable device 12, a wearable device 13, and a mobile terminal 14.

The wearable device 12 has the same functions as the wearable device in Embodiment 7. The wearable device 13 has the same functions as the wearable device in Embodiment 8. The mobile terminal 14 has the same functions as the mobile terminal in Embodiment 9. Details are not described again herein.

As can be known from above, this embodiment of the present disclosure provides a data transmission system. After the wearable device 12 obtains by listening, a second broadcast message sent by the wearable device 13 and determines that the wearable device 13 supports processing of service data of the wearable device 12, the wearable device 12 breaks a connection to the mobile terminal 14, establishes a connection to the wearable device 13, and sends data in an allocated receive or transmit timeslot to the second wearable device 13. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between a first wearable device and a second wearable device, the first wearable device establishes a connection to the second wearable device directly, and transmits the data to the second wearable device without using the mobile terminal for forwarding, and network overheads are reduced greatly.

Embodiment 11

Figure 16:
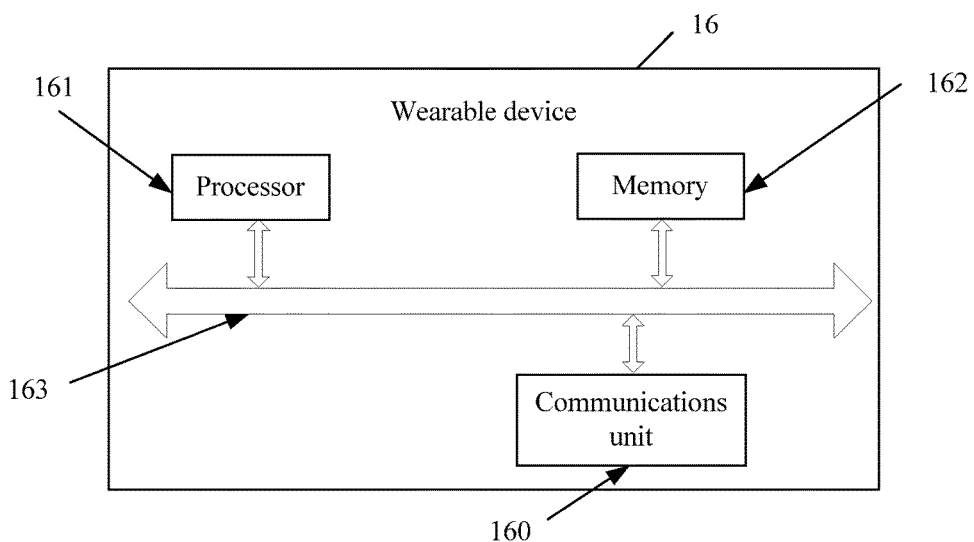
FIG. 16 is a structural diagram of a wearable device according to an embodiment of the present disclosure.

FIG. 16 shows a structural diagram of a wearable device 16 provided by this embodiment of the present disclosure. The wearable device 16 is configured to perform the method in Embodiment 1.

As shown in FIG. 16, the wearable device 16 may include a communications unit 160, a processor 161, a memory 162, and at least one communications bus 163 configured to implement connections and mutual communication between the apparatuses.

The communications unit 160 is configured to perform data transmission with an external network element.

The processor 161 may be a central processing unit (CPU).

The memory 162 may be a volatile memory, for example, a random access memory (RAM), or a non-volatile memory, for example, a read-only memory (ROM), a flash memory, a hard disk drive (HDD), or a solid-state drive (SSD), or a combination of the foregoing types of memories, and provides an instruction and data for the processor 161.

The communications unit 160 is configured to send a first broadcast message to a second wearable device, and listen for a second broadcast message sent by the second wearable device to the wearable device 16.

The first broadcast message is used to indicate that the wearable device 16 may establish a connection to another wearable device, and may be sent by global broadcast to all wearable devices including the second wearable device in a personal area network, or may be sent by directed broadcast to only the second wearable device. For example, assuming that the wearable device B in FIG. 1 is the wearable device 16, and that the wearable device A is the second wearable device, the wearable device B may send the first broadcast message to the wearable device A, the wearable device C, the wearable device D, and the wearable device 16 in the personal area network, or may send the first broadcast message to the wearable device A in a directed manner.

The second broadcast message is used to indicate that the second wearable device has a BLUETOOTH hub function and may establish a connection to the wearable device 16.

The processor 161 is configured to determine, after the communications unit 160 obtains the second broadcast message by listening, whether the second wearable device supports processing of service data of the wearable device 16.

The communications unit 160 is further configured to establish a connection to the second wearable device after the processor 161 determines that processing of the service data is supported, and send the service data in an allocated receive or transmit timeslot to the second wearable device.

The receive or transmit timeslot is different from a receive or transmit timeslot allocated by the mobile terminal, and may be allocated by the second wearable device, or may be allocated by the wearable device 16.

Optionally, when receive or transmit timeslots allocated to the wearable device 16 are reduced because a quantity of wearable devices connected to the mobile terminal increases, and consequentially, the service data transmitted by the wearable device 16 cannot meet a quality of service requirement (for example, a low delay), the wearable device 16 may require that a quantity of receive or transmit timeslots allocated by the second wearable device should be greater than a quantity of receive or transmit timeslots allocated by the mobile terminal to the wearable device 16 in order to meet the quality of service requirement. For example, as can be known from comparison between FIG. 3 and FIG. 6, receive or transmit timeslots allocated by the wearable device A to the wearable device B are more than receive or transmit timeslots allocated by the mobile terminal to the wearable device B, and frequency resources occupied by the wearable device B for sending data to the wearable device A are the same as frequency resources occupied by other wearable devices for sending data to the mobile terminal, that is, for different master devices, data is transmitted in frequency division multiplexing mode between wearable devices connected to the master devices. In this way, when quality of service of the transmitted data is met, utilization of frequency resources is also greatly increased.

It should be noted that, in this embodiment of the present disclosure, when establishing the connection to the second wearable device, the communications unit 160 may maintain a connection relationship with the mobile terminal, but the communications unit 160 and the mobile terminal do not transmit data to each other.

Alternatively, the communications unit 160 may break a connection relationship with the mobile terminal completely. For example, in the personal area network shown in FIG. 1, after the wearable device B (the wearable device 16) determines that the wearable device A (the second wearable device) supports processing of service data of the wearable device B, the wearable device B breaks a connection to the mobile terminal, connects to the wearable device A (as shown in FIG. 5), and sends, to the wearable device A, the service data in a receive or transmit timeslot (as shown in FIG. 6) allocated by the wearable device A.

Although the wearable device 16 has determined that the second wearable device is a device having the BLUETOOTH hub function and may establish a connection to the wearable device, to ensure that the service data of the wearable device 16, after being sent to the second wearable device, can be processed by the second wearable device, in this embodiment, the wearable device 16 further needs to determine whether the second wearable device supports processing of the service data of the wearable device 16.

Optionally, the communications unit 160 may be further configured to send a query request message to the second wearable device, and receive a query response message returned by the second wearable device, where the query request message is used to query service data supported by the second wearable device, and the query response message includes the service data supported by the second wearable device, and the processor 161 is further configured to determine that the second wearable device supports processing of the service data if the service data supported by the second wearable device and received by the communications unit 160 includes the service data of the wearable device 16, or determine that the second wearable device does not support processing of the service data if the service data supported by the second wearable device does not include the service data of the wearable device 16, that is, the second wearable device cannot parse the service data, and even if a transmission delay of the service data increases, the communications unit 160 cannot establish a connection to the second wearable device.

Service data of a wearable device is generated by a service supported by the wearable device. Each service supported by the wearable device corresponds to a specific piece of service data. For example, if sports shoes may support services such as heart rate measurement, and running speed and cadence measurement, service data that may be generated by the sports shoes may include heart rate measurement service data, and RSCS data. Each service includes at least one feature, and service data corresponding to the feature has a defined specific data structure, and includes elements such as a feature name, a feature value, a feature value unit, and a data type. In this embodiment, the service data of the wearable device 16 may be service data that is already sent to the mobile terminal but is not sent successfully, or may be service data that does not meet some quality conditions or the like during sending and will be sent to the mobile terminal.

For example, service data being transmitted between a wearable device that is sports shoes and the mobile terminal is RSCS data, service data being transmitted between a wearable device that is an anti-loss tag and the mobile terminal is IAS data, in this case, if types of service data supported by the second wearable device include RSCS, IAS, and temperature and humidity services, the sports shoes and the anti-loss tag respectively determine, after receiving a query response message sent by the second wearable device, that the second wearable device supports processing of the RSCS and the IAS, if types of service data supported by the second wearable device include IAS and temperature and humidity services, after the sports shoes and the anti-loss tag respectively receive a query response message sent by the second wearable device, the sports shoes determine that the second wearable device does not support processing of the service data transmitted between the sports shoes and the mobile terminal, but the anti-loss tag determines that the second wearable device does not support processing of the service data transmitted between the sports shoes and the mobile terminal, and therefore terminates establishment of a connection to the second wearable device.

Optionally, the communications unit 160 is further configured to establish a BLE connection to the second wearable device by performing three existing processes of discovery, pairing, and connection establishment. Details are not described herein.

For example, in the personal area network shown in FIG. 1, after the wearable device B (the wearable device 16) determines that the wearable device A (the second wearable device) supports processing of service data of the wearable device B, the wearable device B breaks a connection to the mobile terminal, connects to the wearable device A (as shown in FIG. 5), and sends, to the wearable device A, the service data in a receive or transmit timeslot (as shown in FIG. 6) allocated by the wearable device A.

Optionally, in this embodiment of the present disclosure, if the service data transmitted by the wearable device 16 cannot meet the quality of service requirement because the receive or transmit timeslots allocated to the wearable device 16 are reduced due to the increase of wearable devices connected to the mobile terminal, to meet the quality of service requirement of the service data transmitted by the wearable device 16, before the communications unit 160 sends the first broadcast message to the second wearable device, the processor 161 is further configured to detect quality of service when the wearable device 16 sends the service data to the mobile terminal, and determine that the quality of service does not meet a preset quality of service condition, where the quality of service includes a transmission delay and a transmission rate, the preset quality of service condition includes a preset transmission rate threshold and a preset transmission delay threshold, and that the quality of service does not meet a preset quality of service condition may include that the transmission delay is greater than the preset transmission delay threshold, the transmission rate is lower than the preset transmission rate threshold, or the transmission delay is greater than the preset transmission delay threshold, and the transmission rate is lower than the preset transmission rate threshold.

It should be noted that, the preset transmission delay threshold and the preset transmission rate threshold are set according to a requirement of the transmitted service data, and are not limited in this embodiment of the present disclosure.

Correspondingly, the first broadcast message sent by the communications unit 160 may be a global broadcast message, and sent to each wearable device in the personal area network.

In addition, in this embodiment of the present disclosure, to implement direct communication between wearable devices when there is service data of direct communication between the wearable device 16 and the second wearable device in order to reduce network overheads, the communications unit 160 is further configured to receive, before the communications unit 160 sends the first broadcast message to the second wearable device, a notification message sent by the mobile terminal, where the notification message includes a device identity and address information of the second wearable device and is used to notify the wearable device 16 that a final receiver of the service data is the second wearable device, or the processor 161 is further configured to detect, before the communications unit 160 sends the first broadcast message to the second wearable device, that a final receiver of the service data is the second wearable device.

Correspondingly, the first broadcast message sent by the communications unit 160 is a directed broadcast message sent to only the second wearable device.

Because the second wearable device used as a BLUETOOTH hub is limited by a device size, a battery capacity of the second wearable device is far less than a battery capacity of the mobile terminal used as a master device, and after the second wearable device used as a master device is connected to the wearable device 16, power consumption of the second wearable device is relatively fast, and this affects use of the second wearable device. In addition, although the second wearable device having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, a service of the wearable device 16 connected to the second wearable device needs to be migrated to the mobile terminal when appropriate. For example, when a quantity of wearable devices connected to the mobile terminal is not large and available timeslot resources are relatively sufficient, the wearable device 16 may consider breaking the connection to the second wearable device and establish a connection to the mobile terminal, and then a daisy chain network topology is changed to a star network topology. Specific implementation is as follows.

The communications unit 160 is further configured to receive a disconnection request message sent by the second wearable device, and break the connection to the second wearable device, and receive a connection request message sent by the mobile terminal, establish a connection to the mobile terminal, and receive or transmit the service data in an allocated receive or transmit timeslot, where the disconnection request message is used to request the wearable device 16 to break the connection to the second wearable device, and the connection request message is used to request the wearable device 16 to establish the connection to the mobile terminal.

For example, the wearable device B and the wearable device C connected to the wearable device A as shown in FIG. 5 respectively break a connection to the wearable device A, and still connect to the mobile terminal (as shown in FIG. 1), and the wearable device B or the wearable device C receives or transmits service data using a corresponding receive or transmit timeslot in a channel index pattern shown in FIG. 3.

This embodiment of the present disclosure provides the wearable device 16. After the wearable device 16 obtains by listening, a second broadcast message sent by a second wearable device and determines that the second wearable device supports processing of service data of the wearable device 16, the wearable device 16 breaks a connection to a mobile terminal, establishes a connection to the second wearable device, and sends data in an allocated receive or transmit timeslot to the second wearable device. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between a first wearable device and the second wearable device, the first wearable device establishes a connection to the second wearable device directly, and transmits the data to the second wearable device without using the mobile terminal for forwarding, and network overheads are reduced greatly.

Embodiment 12

Figure 17:
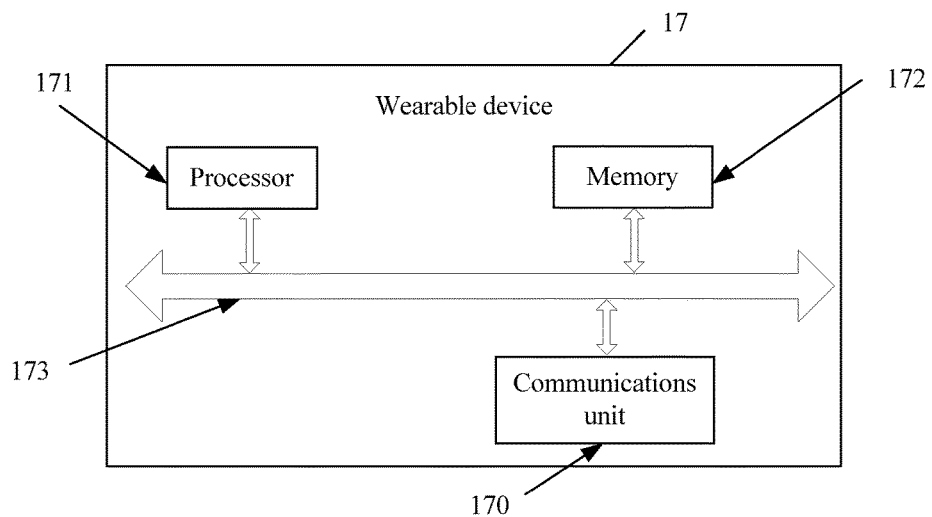
FIG. 17 is a structural diagram of a wearable device according to an embodiment of the present disclosure.

FIG. 17 shows a structural diagram of a wearable device 17 provided by this embodiment of the present disclosure. The wearable device 17 is configured to perform the method in Embodiment 2.

As shown in FIG. 17, the wearable device 17 may include a communications unit 170, a processor 171, a memory 172, and at least one communications bus 173 configured to implement connections and mutual communication between the apparatuses.

The communications unit 170 is configured to perform data transmission with an external network element.

The processor 171 may be a CPU.

The memory 172 may be a volatile memory, for example, a RAM, or a non-volatile memory, for example, a ROM, a flash memory an HDD, or an SSD, or a combination of the foregoing types of memories, and provides an instruction and data for the processor 171.

The communications unit 170 is configured to receive a first broadcast message sent by a first wearable device, and send a second broadcast message to the first wearable device.

The processor 171 is configured to generate a second broadcast message.

The second broadcast message is used to indicate that the wearable device 17 has a BLUETOOTH hub function and may connect to the first wearable device.

The communications unit 170 is further configured to send the second broadcast message to the first wearable device, establish a connection to the first wearable device, and receive, in an allocated receive or transmit timeslot, the service data sent by the first wearable device.

The first broadcast message is used to indicate that the first wearable device may establish a connection to another wearable device, and may be sent by global broadcast to all wearable devices including the wearable device 17 in a personal area network, or may be sent by directed broadcast to only the wearable device 17. The second broadcast message is used to indicate that the wearable device 17 has a BLUETOOTH hub function and may connect to the first wearable device.

The receive or transmit timeslot is different from a receive or transmit timeslot allocated by the mobile terminal, and is allocated by a processor of the first wearable device, or is allocated by the processor 171 of the wearable device 17.

Optionally, when receive or transmit timeslots allocated to the first wearable device are reduced because a quantity of wearable devices connected to the mobile terminal increases, and consequentially, the service data transmitted by the first wearable device cannot meet a quality of service requirement (for example, a low delay), the first wearable device may require that a quantity of receive or transmit timeslots allocated by the wearable device 17 should be greater than a quantity of receive or transmit timeslots allocated by the mobile terminal to the first wearable device in order to meet the quality of service requirement. For example, as can be known from comparison between FIG. 3 and FIG. 6, receive or transmit timeslots allocated by the wearable device A to the wearable device B are more than receive or transmit timeslots allocated by the mobile terminal to the wearable device B, and frequency resources occupied by the wearable device B for sending data to the wearable device A are the same as frequency resources occupied by other wearable devices for sending data to the mobile terminal, that is, for different master devices, data is transmitted in frequency division multiplexing mode between wearable devices connected to the master devices. In this way, when quality of service of the transmitted data is met, utilization of frequency resources is also greatly increased.

Optionally, the communications unit 170 is further configured to establish a BLE connection to the first wearable device by performing three existing processes of discovery, pairing, and connection establishment. Details are not described herein.

Optionally, to ensure that the service data transmitted between the first wearable device and the mobile terminal can be still parsed and forwarded by the wearable device 17 after the first wearable device is connected to the wearable device 17, the communications unit 170 is further configured to receive, before the communications unit 170 establishes the connection to the first wearable device, a query request message sent by the first wearable device, where the query request message is used to query service data supported by the wearable device 17. The processor 171 is further configured to generate a query response message, where the query response message includes the service data supported by the wearable device 17, and the communications unit 170 is further configured to send the query response message to the first wearable device such that the first wearable device determines, according to the service data supported by the wearable device 17, that the wearable device 17 supports processing of the service data.

Because the wearable device 17 used as a BLUETOOTH hub is limited by a device size, a battery capacity of the wearable device 17 is far less than a battery capacity of the mobile terminal used as a master device, and after the wearable device 17 used as a master device is connected to the first wearable device, power consumption of the wearable device 17 is relatively fast, and this affects use of the wearable device 17. In addition, although the wearable device 17 having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, a service of the first wearable device connected to the wearable device 17 in the personal area network needs to be migrated. For example, when the quantity of wearable devices connected to the mobile terminal is not large and available timeslot resources are relatively sufficient, the first wearable device needs to further break the connection to the wearable device 17 and establish a connection to the mobile terminal, and then a daisy chain network topology is changed to a star network topology.

The processor 171 is further configured to detect in real time, whether the communications unit 170 needs to break the connection to the first wearable device, and the communications unit 170 is further configured to break the connection to the first wearable device if the processor 171 detects that the communications unit 170 needs to break the connection to the first wearable device, and report address information and a device identity of the first wearable device to the mobile terminal such that the mobile terminal initiates a connection request message to the first wearable device according to the device identity and the address information, where the disconnection request message is used to request the first wearable device to break the connection to the wearable device, and the connection request message is used to request the first wearable device to establish a connection to the mobile terminal.

For example, the processor 171 may further determine, in any one or more of the following manners (1), (2), and (3), whether the connection to the first wearable device needs to be broken.

(1) Detect remaining power of the wearable device 17, and if the remaining power is less than a preset remaining power threshold, determine that the connection to the first wearable device needs to be broken.

The preset remaining power threshold may be set according to a requirement, and is not limited in this embodiment of the present disclosure. If the remaining power is less than the preset remaining power threshold, it indicates that power of the wearable device 17 is consumed excessively, and possibly cannot support subsequent service data reception or transmission by the first wearable device. If the remaining power is greater than the preset remaining power threshold, it indicates that power of the wearable device 17 is relatively sufficient, and may meet a power requirement of the first wearable device for receiving or transmitting the service data.

(2) Detect a remaining time resource after the mobile terminal allocates a time resource to each wearable device connected to the mobile terminal, and if the remaining time resource is greater than or equal to a preset time resource threshold, determine that the connection to the first wearable device needs to be broken.

The preset time resource threshold may be set according to a requirement, and is not limited in this embodiment of the present disclosure. If the remaining time resource is greater than or equal to the preset time resource threshold, it indicates that an existing time resource of the mobile terminal may meet a transmission delay requirement of the first wearable device, that is, when the first wearable device is connected to the mobile terminal and receives or transmits the service data, a transmission delay is not increased. If the remaining time resource is less than the preset time resource threshold, it indicates that an existing time resource of the mobile terminal cannot meet a transmission delay requirement of the first wearable device, that is, after the first wearable device is connected to the mobile terminal, a transmission delay of the first wearable device is increased because the time resource allocated by the mobile terminal to the first wearable device is insufficient.

(3) If a disconnection request message, sent by the user, for breaking the connection to the first wearable device is received, determine that the connection relationship with the first wearable device needs to be broken.

For example, when the wearable device A shown in FIG. 5 detects, in any one or more of the foregoing cases (1), (2), and (3), that a connection to the wearable device B needs to be broken, the wearable device A sends a disconnection request message to the wearable device B, breaks the connection to the wearable device B, and reports address information and a device identity of the wearable device B to the mobile terminal. Therefore, the mobile terminal initiates a connection request message to the wearable device B according to the device identity and the address information, establishes a connection to the wearable device B (as shown in FIG. 1), and uses a receive or transmit timeslot corresponding to the mobile terminal in a channel index pattern shown in FIG. 3 to receive or transmit the service data in order to balance load and power consumption between the mobile terminal and the wearable device 17 used as a BLUETOOTH hub in the personal area network.

This embodiment of the present disclosure provides the wearable device 17. After receiving a first broadcast message sent by a first wearable device, the wearable device 17 sends a second broadcast message to the first wearable device, establishes a connection to the first wearable device, and receives, in an allocated receive or transmit timeslot, the service data sent by the first wearable device. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between the first wearable device and a second wearable device, the first wearable device establishes a connection to the second wearable device directly, and transmits the data to the second wearable device without using the mobile terminal for forwarding, and network overheads are reduced greatly.

Embodiment 13

Figure 18:
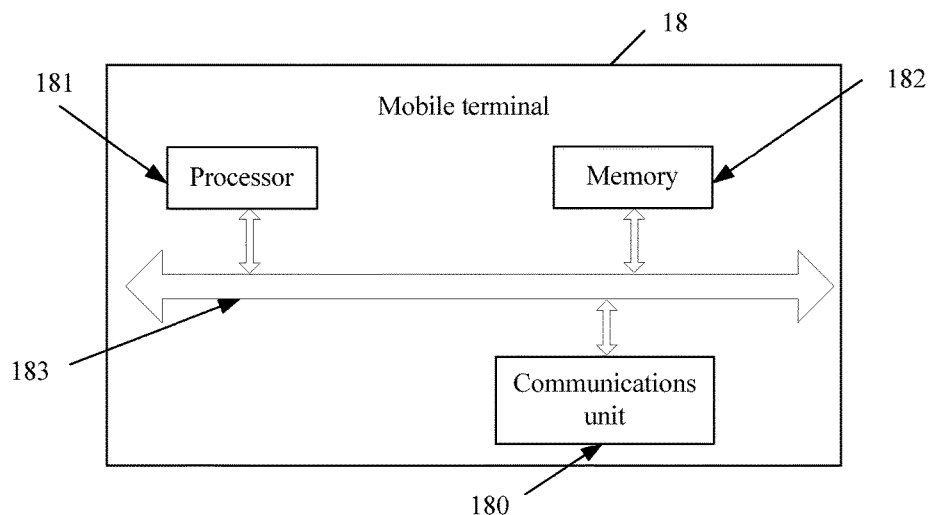
FIG. 18 is a structural diagram of a mobile terminal according to an embodiment of the present disclosure.

FIG. 18 shows a structural diagram of a mobile terminal 18 provided by this embodiment of the present disclosure. The mobile terminal 18 is configured to perform the method in Embodiment 3.

As shown in FIG. 18, the mobile terminal 18 may include a communications unit 180, a processor 181, a memory 182, and at least one communications bus 183 configured to implement connections and mutual communication between the apparatuses.

The communications unit 180 is configured to perform data transmission with an external network element.

The processor 181 may be a CPU.

The memory 182 may be a volatile memory, for example, a RAM, or a non-volatile memory, for example, a ROM, a flash memory, an HDD, or an SSD, or a combination of the foregoing types of memories, and provides an instruction and data for the processor 181.

The processor 181 is configured to detect that service data sent by the first wearable device to the mobile terminal 18 is service data to be forwarded by the mobile terminal 18.

The communications unit 180 is configured to send a notification message to the first wearable device when the processor 181 detects that the service data is the data to be forwarded, receive disconnection request information sent by the first wearable device, and break a connection to the first wearable device.

The notification message includes a device identity and address information of the second wearable device and is used to notify the first wearable device that a final receiver of the service data is the second wearable device, and the disconnection request message is used to request the mobile terminal 18 to break the connection to the first wearable device.

Optionally, in this embodiment of the present disclosure, if the service data transmitted by the first wearable device cannot meet a quality of service requirement because receive or transmit timeslots allocated to the first wearable device are reduced due to an increase of wearable devices connected to the mobile terminal, the communications unit 180 of the mobile terminal 18 may further directly receive the disconnection request information sent by the first wearable device, break the connection to the first wearable device, and adjust a topology of a personal area network. In this way, after the processing by the foregoing units or modules, the first wearable device breaks the connection to the mobile terminal, and further establishes a connection to the second wearable device. For example, the wearable device B adjusts a connection status as shown in FIG. 1 to a connection status as shown in FIG. 5.

Because the second wearable device used as a BLUETOOTH hub is limited by a device size, a battery capacity of the second wearable device is far less than a battery capacity of the mobile terminal 18 used as a master device, and after the second wearable device used as a master device is connected to the first wearable device, power consumption of the second wearable device is relatively fast, and this affects use of the second wearable device. In addition, although the second wearable device having high intelligence and used as a BLUETOOTH hub is basically a device having a screen, a size of the screen and a display resolution of the screen are not comparable to those of a mobile terminal such as a smartphone or a tablet computer, user experience is relatively poor, and intentions and requirements of a user cannot be met in various aspects except a transmission requirement. In this case, optionally, in this embodiment of the present disclosure, a service of the first wearable device connected to the second wearable device needs to be migrated to the mobile terminal 18 when appropriate. For example, when the quantity of wearable devices connected to the mobile terminal 18 is not large and available timeslot resources are relatively sufficient, the first wearable device may consider breaking the connection to the second wearable device and establish a connection to the mobile terminal 18, and then a daisy chain network topology is changed to a star network topology. Specific implementation is as follows.

The communications unit 180 is further configured to receive address information and a device identity of the first wearable device that are reported by the second wearable device after the communications unit 180 breaks the connection to the first wearable device, initiate a connection request message to the first wearable device according to the device identity and the address information, and reestablish a connection to the first wearable device, where the connection request message is used to request to establish a connection to the first wearable device.

For example, the wearable device B in FIG. 5 breaks a connection to the wearable device A due to reasons such as insufficient power of the wearable device A, and reestablishes a connection to the mobile terminal 18 (as shown in FIG. 1).

As can be known from above, this embodiment of the present disclosure provides the mobile terminal 18. The mobile terminal 18 receives disconnection request information sent by a first wearable device, and breaks a connection to the first wearable device such that the first wearable device establishes a connection to another wearable device. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between the first wearable device and a second wearable device, the first wearable device establishes a connection to the second wearable device directly, and transmits the data to the second wearable device without using the mobile terminal for forwarding, and network overheads are reduced greatly.

Embodiment 14

Figure 19:
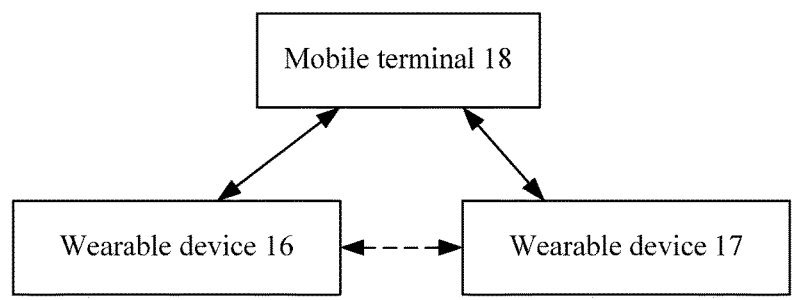
FIG. 19 is a structural diagram of a data transmission system according to an embodiment of the present disclosure.

FIG. 19 shows a structural diagram of a data transmission system provided by this embodiment of the present disclosure. The data transmission system is configured to perform the methods in Embodiment 4, Embodiment 5, and Embodiment 6.

As shown in FIG. 19, the system may include a wearable device 16, a wearable device 17, and a mobile terminal 18.

The wearable device 16 has the same functions as the wearable device in Embodiment 11. The wearable device 17 has the same functions as the wearable device in Embodiment 12. The mobile terminal 18 has the same functions as the mobile terminal in Embodiment 13. Details are not described again herein.

As can be known from above, this embodiment of the present disclosure provides a data transmission system. After the wearable device 16 obtains by listening, a second broadcast message sent by the wearable device 17 and determines that the wearable device 17 supports processing of service data of the wearable device 16, the wearable device 16 breaks a connection to the mobile terminal 18, establishes a connection to the wearable device 17, and sends data in a receive or transmit timeslot to the wearable device 17. In this way, wearable devices are interconnected, and an existing situation in which a wearable device in a personal area network must be connected to a mobile terminal and cannot be connected to a wearable device is changed. A star network topology of the personal area network is adjusted to a daisy chain network topology, and a more flexible network topology is provided. Especially when there is service data directly transmitted between a first wearable device and a second wearable device, the first wearable device establishes a connection to the second wearable device directly, and transmits the data to the second wearable device without using the mobile terminal for forwarding, and network overheads are reduced greatly.

It may be clearly understood by a person skilled in the art that, for the purpose of convenient and brief description, for a detailed working process of the foregoing unit and system, reference may be made to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

A person of ordinary skill in the art may understand that all or a part of the steps of the methods in the embodiments may be implemented by a program instructing relevant hardware. The program may be stored in a computer readable storage medium. The storage medium may include a ROM, a RAM, a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A first wearable device comprising:
   a non-transitory computer-readable storage medium comprising instructions; and
   a computer processor coupled to the non-transitory computer-readable medium and configured to execute the instructions to:
   send, by the first wearable device, a first broadcast message to the second wearable device, the first broadcast message indicating that the first wearable device may establish a connection to another wearable device;
   determine, by the first wearable device, whether the second wearable device supports processing of service data of the first wearable device when the first wearable device obtains by listening, a second broadcast message from the second wearable device, the second broadcast message indicating that the second wearable device has a BLUETOOTH hub function and may establish a connection to the first wearable device, the first wearable device determining whether the second wearable device supports processing of the service data of the first wearable device by:
   sending, by the first wearable device, a query request message to the second wearable device, the query request message querying service data supported by the second wearable device;
   receiving, by the first wearable device, a query response message from the second wearable device, the query response message comprising the service data supported by the second wearable device; and
   determining, by the first wearable device, that the second wearable device supports processing of the service data when the service data supported by the second wearable device comprises the service data of the first wearable device;
   establish, by the first wearable device, a connection to the second wearable device when the first wearable device determines that the second wearable device supports processing of the service data; and
   send, by the first wearable device, the service data in an allocated receive or transmit timeslot to the second wearable device.

2. The first wearable device of claim 1, wherein before the computer processor is configured to execute the instructions to send the first broadcast message to the second wearable device, the computer processor is further configured to execute the instructions to:
   detect, by the first wearable device, quality of service when the first wearable device sends the service data to the mobile terminal; or
   determine, by the first wearable device, that the quality of service does not meet a preset quality of service condition, and
   the quality of service comprising a transmission delay and a transmission rate.

3. The first wearable device of claim 2, wherein the preset quality of service condition comprises a preset transmission rate threshold and a preset transmission delay threshold, and the quality of service that does not meet the preset quality of service condition comprising that the transmission delay is greater than the preset transmission delay threshold.

4. The first wearable device of claim 2, wherein the preset quality of service condition comprises a preset transmission rate threshold and a preset transmission delay threshold, and the quality of service that does not meet the preset quality of service condition comprising that the transmission rate is lower than the preset transmission rate threshold.

5. The first wearable device of claim 2, wherein the preset quality of service condition comprises a preset transmission rate threshold and a preset transmission delay threshold, and the quality of service that does not meet the preset quality of service condition comprising that the transmission delay is greater than the preset transmission delay threshold, and the transmission rate is lower than the preset transmission rate threshold.

6. The first wearable device of claim 1, wherein before the computer processor is configured to execute the instructions to send the first broadcast message to the second wearable device, the computer processor is further configured to execute the instructions to receive, by the first wearable device, a notification message from the mobile terminal, the notification message comprising a device identity and address information of the second wearable device, and the notification message notifying the first wearable device that a final receiver of the service data is the second wearable device.

7. The first wearable device of claim 1, wherein before the computer processor is configured to execute the instructions to send the first broadcast message to the second wearable device, the computer processor is further configured to execute the instructions to detect, by the first wearable device, that a final receiver of the service data is the second wearable device.

8. The first wearable device of claim 1, wherein after the computer processor is configured to establish the connection to the second wearable device, the computer processor is further configured to execute the instructions to:
receive, by the first wearable device, a disconnection request message from the second wearable device, the disconnection request message requesting the first wearable device to break the connection to the second wearable device;
receive, by the first wearable device, a connection request message from the mobile terminal after breaking the connection to the second wearable device according to the disconnection request message;
establish, by the first wearable device, a connection to the mobile terminal; and
receive, by the first wearable device, the service data in an allocated receive timeslot.

9. The first wearable device of claim 1, wherein after the computer processor is configured to establish the connection to the second wearable device, the computer processor is further configured to:
receive, by the first wearable device, a disconnection request message from the second wearable device, the disconnection request message requesting the first wearable device to break the connection to the second wearable device;
receive, by the first wearable device, a connection request message from the mobile terminal after breaking the connection to the second wearable device according to the disconnection request message;
establish by the first wearable device, a connection to the mobile terminal; and
transmit, by the first wearable device, the service data in an allocated transmit timeslot.

10. A second wearable device comprising:
a non-transitory computer-readable storage medium comprising instructions; and
a computer processor coupled to the non-transitory computer-readable medium and configured to execute the instructions to:
receive, by the second wearable device, a first broadcast message from the first wearable device, the first broadcast message indicating that the first wearable device may establish a connection to another wearable device;
send, by the second wearable device, a second broadcast message to the first wearable device, the second broadcast message indicating that the second wearable device has a BLUETOOTH hub function and may connect to the first wearable device;
receive, by the second wearable device, a query request message from the first wearable device, the query request message querying service data supported by the second wearable device;
send, by the second wearable device, a query response message to the first wearable device, the query response message comprising the service data supported by the second wearable device; and
establish, by the second wearable device, a connection to the first wearable device; and
receive, by the second wearable device, in an allocated receive timeslot, service data from the first wearable device.

11. The second wearable device of claim 10, wherein after the computer processor is configured to establish the connection to the first wearable device, the computer processor is further configured to:
detect, by the second wearable device in real time, whether the connection to the first wearable device needs to be broken;
break, by the second wearable device, the connection to the first wearable device when the connection to the first wearable device needs to be broken; and
report, by the second wearable device, address information and a device identity of the first wearable device to the mobile terminal.

12. The second wearable device of claim 11, wherein the computer processor is configured to detect whether the connection to the first wearable device needs to be broken, comprises:
detecting, by the second wearable device, remaining power of the second wearable device; and
determining, by the second wearable device, that the connection to the first wearable device needs to be broken when the remaining power is less than a preset remaining power threshold.

13. The second wearable device of claim 11, wherein the computer processor is configured to detect whether the connection to the first wearable device needs to be broken, comprises:
detecting, by the second wearable device, a remaining time resource after the mobile terminal allocates a time resource to each wearable device connected to the mobile terminal; and
determining, by the second wearable device, that the connection to the first wearable device needs to be broken when the remaining time resource is greater than a preset time resource threshold.

14. The second wearable device of claim 11, wherein the computer processor is configured to detect whether the connection to the first wearable device needs to be broken, comprises:
detecting, by the second wearable device, a remaining time resource after the mobile terminal allocates a time resource to each wearable device connected to the mobile terminal; and
determining, by the second wearable device, that the connection to the first wearable device needs to be broken when the remaining time resource is equal to a preset time resource threshold.

15. The second wearable device of claim 11, wherein the computer processor is configured to detect whether the connection to the first wearable device needs to be broken, comprises determining that the connection to the first wearable device needs to be broken when a disconnection request message, from a user, for breaking the connection to the first wearable device is received.

16. A mobile terminal comprising:
a non-transitory computer-readable storage medium comprising instructions; and
a computer processor coupled to the non-transitory computer-readable medium and configured to execute the instructions to:
detect, by the mobile terminal, that service data from a first wearable device to the mobile terminal is service data to be forwarded by the mobile terminal;
send, by the mobile terminal, a notification message to the first wearable device, the notification message comprising a device identity and address information of a second wearable device, and the notification message notifying the first wearable device that a final receiver of the service data is the second wearable device;

receive, by the mobile terminal, a disconnection request message from the first wearable device, the disconnection request message requesting the mobile terminal to break a connection to the first wearable device; and break, by the mobile terminal, the connection to the first wearable device according to the disconnection request message.

17. The mobile terminal of claim 16, wherein after the computer processor is configured to break the connection to the first wearable device, the computer processor is further configured to:

receive, by the mobile terminal, address information and a device identity of the first wearable device reported by the second wearable device;

initiate, by the mobile terminal, a connection request message to the first wearable device according to the device identity and the address information, the connection request message requesting to re-establish the connection to the first wearable device; and re-establish, by the mobile terminal, the connection to the first wearable device.

* * * * *